United States Patent
Lee et al.

(10) Patent No.: US 9,357,092 B2
(45) Date of Patent: May 31, 2016

(54) IMAGE FORMING APPARATUS, DRIVING METHOD THEREOF, AND COMPUTER-READABLE RECORDING MEDIUM

(71) Applicant: SAMSUNG Electronics Co., Ltd., Suwon-si, Gyeonggi-do (KR)

(72) Inventors: Jong-seung Lee, Suwon-si (KR); Jeong-min Kim, Busan (KR); Jin-hwi Jun, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/940,495

(22) Filed: Jul. 12, 2013

(65) Prior Publication Data
US 2014/0078530 A1  Mar. 20, 2014

(30) Foreign Application Priority Data

Sep. 17, 2012  (KR) .................. 10-2012-0102953

(51) Int. Cl.
*G06F 3/12* (2006.01)
*H04N 1/00* (2006.01)
(Continued)

(52) U.S. Cl.
CPC ............ *H04N 1/00896* (2013.01); *G06F 21/44* (2013.01); *G06F 21/608* (2013.01); *G06F 21/74* (2013.01); *G06F 21/81* (2013.01);
(Continued)

(58) Field of Classification Search
CPC . G03G 15/5004; G06F 1/3209; G06F 1/3284; G06F 21/305; G06F 21/44; G06F 2221/2105; G06F 21/608; G06F 21/81; G06F 2221/2101; G06F 2221/2143; G06F 63/0853; H04N 1/4406; H04N 1/00896; H04N 1/00278; H04N 1/44
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

2009/0228695 A1* 9/2009 Pathak ............................. 713/1
2009/0316178 A1* 12/2009 Tanaka .................... G06F 21/81
358/1.14

(Continued)

FOREIGN PATENT DOCUMENTS

| JP | 2006-203422 | 8/2006 |
| JP | 2006-218810 | 8/2006 |
| JP | 2011-259271 | 12/2011 |

OTHER PUBLICATIONS

International Search Report dated Aug. 21, 2013 issued in International Application No. PCT/KR2013/003803.

(Continued)

*Primary Examiner* — Thierry L Pham
(74) *Attorney, Agent, or Firm* — Staas & Halsey LLP

(57) ABSTRACT

An image forming apparatus includes a communication interface unit which communicates with an external apparatus, a controller which, if a job performance command is received from the external apparatus when an operation mode of the image forming apparatus is a power saving mode, performs authentication of the external apparatus while maintaining the power saving mode, and a function unit which converts an operation mode of the image forming apparatus according to the authentication result and performs a function corresponding to the job performance command.

19 Claims, 30 Drawing Sheets

(51) Int. Cl.
*H04N 1/44* (2006.01)
*G06F 21/44* (2013.01)
*G06F 21/74* (2013.01)
*G06F 21/60* (2013.01)
*G06F 21/81* (2013.01)
*H04L 29/06* (2006.01)
*G06K 15/00* (2006.01)

(52) U.S. Cl.
CPC ........ *H04L63/0853* (2013.01); *H04N 1/00278* (2013.01); *H04N 1/44* (2013.01); *G06F 2221/2101* (2013.01); *G06F 2221/2105* (2013.01); *G06F 2221/2143* (2013.01)

(56) References Cited

U.S. PATENT DOCUMENTS

| 2010/0325458 | A1 | 12/2010 | Yamaguchi | |
| 2011/0019225 | A1* | 1/2011 | Jung | 358/1.15 |
| 2011/0219250 | A1 | 9/2011 | Hitaka et al. | |
| 2012/0013929 | A1 | 1/2012 | Otaki | |
| 2013/0036458 | A1* | 2/2013 | Liberman et al. | 726/6 |
| 2013/0083346 | A1 | 4/2013 | Fujiki et al. | |
| 2013/0232257 | A1* | 9/2013 | Mukai et al. | 709/224 |

OTHER PUBLICATIONS

Written Opinion of the International Searching Authority dated Aug. 21, 2013 issued in International Application No. PCT/KR2013/003803.

Extended European Search Report issued by the European Patent Office on Oct. 23, 2014 in the corresponding European patent application No. 13170807.5.

Examination Report issued by the Australian Patent Office on Oct. 7, 2015 in the corresponding Australian patent application No. 2013316378.

* cited by examiner

FIG. 9

THIS IS PRINTING REQUEST FROM
UNAUTHENTICATED APPARATUS

| Index | IP |
|---|---|
| 1 | 192. 163. 1. 10 |
| 2 | 192. 163. 1. 250 |
| 3 | 192. 163. 1. 116 |
| ⋮ | ⋮ |

FIG. 22

| Index | IP |
|-------|-----------------|
| 1     | 192. 163. 1. xxx |
| 2     | 192. 165. xxx. xxx |
| ⋮     | ⋮ |

FIG. 23

| Index | MAC |
|-------|-----|
| 1 | E0-69-65-BB-65 |
| 2 | 00-50-C2-2B-B0 |
| 3 | : |
| ⋮ | : |

FIG. 24

|   | IP | MAC |
|---|---|---|
| 1 | 192.163.1.10 | E0-69-65-BB-65 |
| 2 | 192.163.1.250 | 00-50-C2-2B-B0 |
| ⋮ | ⋮ | ⋮ |

FIG. 25

| Index | ID | Password |
|---|---|---|
| 1 | SAMSUNG 01 | 1234 |
| 2 | SAMSUNG 02 | 5678 |
| 3 | SAMSUNG 04 | 1256 |
| ⋮ | ⋮ | ⋮ |

FIG. 26

| | ID | Password | Authority for printing | Authority for fax |
|---|---|---|---|---|
| 1 | SAMSUNG 01 | 1234 | O | X |
| 2 | SAMSUNG 02 | 5678 | O | O |
| 3 | SAMSUNG 04 | 1256 | X | O |
| ⋮ | ⋮ | ⋮ | | |

IMAGE FORMING APPARATUS, DRIVING METHOD THEREOF, AND COMPUTER-READABLE RECORDING MEDIUM

CROSS-REFERENCE TO RELATED APPLICATIONS

This application claims priority under 35 U.S.C. §119 from Korean Patent Application No. 2012-0102953, filed in the Korean Intellectual Property Office on Sep. 17, 2012, the content of which is incorporated herein by reference in its entirety.

BACKGROUND OF THE INVENTION

1. Field of the Invention

The present general inventive concept relates to an image forming apparatus, a driving method thereof, and a computer-readable recording medium, and more particularly, to an image forming apparatus which may reduce power consumption, a driving method thereof, and a computer-readable recording medium.

2. Description of the Related Art

An image forming apparatus performs image forming jobs, such as generating, printing, receiving, and transmitting image data, and examples of an image forming apparatus include a printer, a scanner, a copy machine, a fax machine, and a Multi-Function Peripheral (MFP) which performs the above functions in a single device.

Recently, security has become important in our society and thus, an image forming apparatus is supporting security-related functions. Accordingly, if a printing command is received from an external apparatus, an image forming apparatus performs authentication for the apparatus or a user of the apparatus.

A conventional image forming apparatus cannot perform such an authentication operation in a power saving mode. Specifically, a recent image forming apparatus has a separate auxiliary CPU which operates with low power in order to reduce power consumption, and if a response to a state request or a printing command is input from an external apparatus, the auxiliary CPU merely performs the function of waking up a main CPU. Accordingly, if a printing command is received in a power saving mode, the auxiliary CPU wakes up the main CPU, and the main CPU performs the authentication operation.

As such, the conventional image forming apparatus cannot perform the authentication operation in the power saving mode, and thus even in the case where a printing operation is not performed as a printing command is received from a user or an apparatus which is not authenticated, the image forming apparatus is woken up, consuming power unnecessarily.

A recent image forming apparatus has become highly sophisticated and comprises a plurality of non-volatile memories, but the conventional image forming apparatus manages power states of a plurality of non-volatile memories. Accordingly, even when a simple printing operation (specifically, an operation which can be performed without driving all of the non-volatile memories) is performed, all of the memories are operated, causing unnecessary power consumption.

SUMMARY OF THE INVENTION

The present general inventive concept provides an image forming apparatus which is capable of performing an authentication operation while maintaining a power saving state, a driving method thereof, and a computer-readable recording medium.

The present general inventive concept also provides an image forming apparatus which is capable of controlling an operation state of each of a plurality of non-volatile memories, a driving method thereof, and a computer-readable recording medium.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing an image forming apparatus having a plurality of operation modes, the image forming apparatus including a communication interface unit to communicate with an external apparatus, a controller to receive a job performance command from the external apparatus when an operation mode of the image forming apparatus is a power saving mode and to perform authentication of the external apparatus while maintaining the power saving mode, and a function unit to convert an operation mode of the image forming apparatus according to the authentication result and to perform a function corresponding to the job performance command.

The controller may include a main CPU which controls the function unit in a normal mode and an auxiliary CPU which, if a job performance command is received from an external apparatus in a power saving mode, performs authentication of the external apparatus.

If an operation mode is a power saving mode, the auxiliary CPU may convert an operation mode of the image forming apparatus from a power saving mode to a normal mode according to the authentication result.

The auxiliary CPU may perform authentication by comparing address information of an external apparatus which has transmitted the job performance command with pre-stored address information of an apparatus.

The address information may be at least one of an IP address and a MAC address of an apparatus.

The auxiliary CPU may determine whether a function corresponding to the job performance command is executable based on the authentication result, and convert an operation mode of the image forming apparatus from a power saving mode to a normal mode according to the determination result.

The auxiliary CPU may control the communication interface unit to notify an external apparatus which has transmitted the job performance command of the authentication result and the determination result.

The apparatus may further include a first memory which operates during a normal mode and operates in a self-refresh mode or in a power cut-off mode during a power saving mode and a second memory which stores job data corresponding to the job performance request during a power saving mode, and the auxiliary CPU may delete job data stored in the second memory if a job performance command is received from an unauthenticated external apparatus based on the authentication result.

The apparatus may further include a first memory which includes a plurality of memory modules, and the main CPU may perform a control operation of the function unit using only a part of memory modules from among a plurality of memory modules according to the job performance request.

The main CPU may control the first memory to operate a memory module which is not used during a control operation in a self-refresh mode or in a power cut-off mode.

The apparatus may further include a state analyzing unit which analyzes a state of the function unit periodically during a normal mode and stores state information of the function unit, and the controller may determine a time to convert an operation mode of the image forming apparatus using state information stored in the state analyzing unit.

The foregoing and/or other features and utilities of the present general inventive concept may also be achieved by providing an driving control method of an image forming apparatus having a plurality of operation modes, the method including receiving a job performance command from an external apparatus in a power saving mode, performing authentication of the external apparatus while maintaining the power saving mode, and if it is determined that a job performance command is input from an unauthenticated external apparatus based on the authentication result, maintaining an operation mode of the image forming apparatus as a power saving mode.

The method further includes, if it is determined that a job performance command is input from an authenticated external apparatus based on the authentication result, converting an operation mode of the image forming apparatus to a normal mode and performing a function corresponding to the job performance command.

The performing authentication may include performing authentication by comparing address information of an external apparatus which has transmitted the job performance command with pre-stored address information of an apparatus.

The address information may be at least one of an IP address and a MAC address of an apparatus.

The performing authentication may include performing authentication by requesting an external apparatus which has transmitted the job performance command to transmit user information and comparing user information received in response to the request with pre-stored user information.

The foregoing and/or other features and utilities of the present general inventive concept may also be achieved by providing an computer-readable recording medium including a program to execute a driving control method of an image forming apparatus, the method including receiving a job performance command from an external apparatus in a power saving mode, performing authentication of the external apparatus while maintaining the power saving mode, and if it is determined that a job performance command is input from an unauthenticated external apparatus based on the authentication result, maintaining an operation mode of the image forming apparatus as a power saving mode.

The foregoing and/or other features and utilities of the present general inventive concept may also be achieved by providing an image forming apparatus having a plurality of operation modes, including a function unit having electrical and mechanical components to perform an image forming function, and a controller to receive a job performance command from an external apparatus in a power save mode, to maintain the power saving mode until authentication is performed on at least one of the external apparatus or a user of the external apparatus, and to change the operation mode of the function unit to perform the image forming function corresponding to the job performance command according to the authentication result.

The function unit may be in the power saving mode during the authentication.

The authentication may include a first authentication to be performed on the external apparatus and a second authentication to be performed on user information of the user.

The controller may maintain the power saving mode until the first authentication and the second authentication are performed.

The controller may communicate with an external server other than the external apparatus to perform at least one of the first authentication and the second authentication.

One of the first authentication and the second authentication may be performed prior to the other on according to a priority.

The authentication may be performed on the external apparatus prior to the authentication on the user of the external apparatus.

The controller may include a plurality of processors, the processors may be in the power saving mode when the job performance command is received, and the processors may be maintained in the power saving mode during the authentication.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 9 is a view illustrating a user interface window which can be displayed on a host apparatus;

FIGS. 21 to 24 are views illustrating examples of address information pre-stored in an image forming apparatus according an exemplary embodiment of the present general inventive concept;

FIGS. 25 and 26 are views illustrating examples of user information pre-stored in an image forming apparatus according to an exemplary embodiment of the present general inventive concept;

DETAILED DESCRIPTION OF THE PREFERRED EMBODIMENTS

Figure 1:
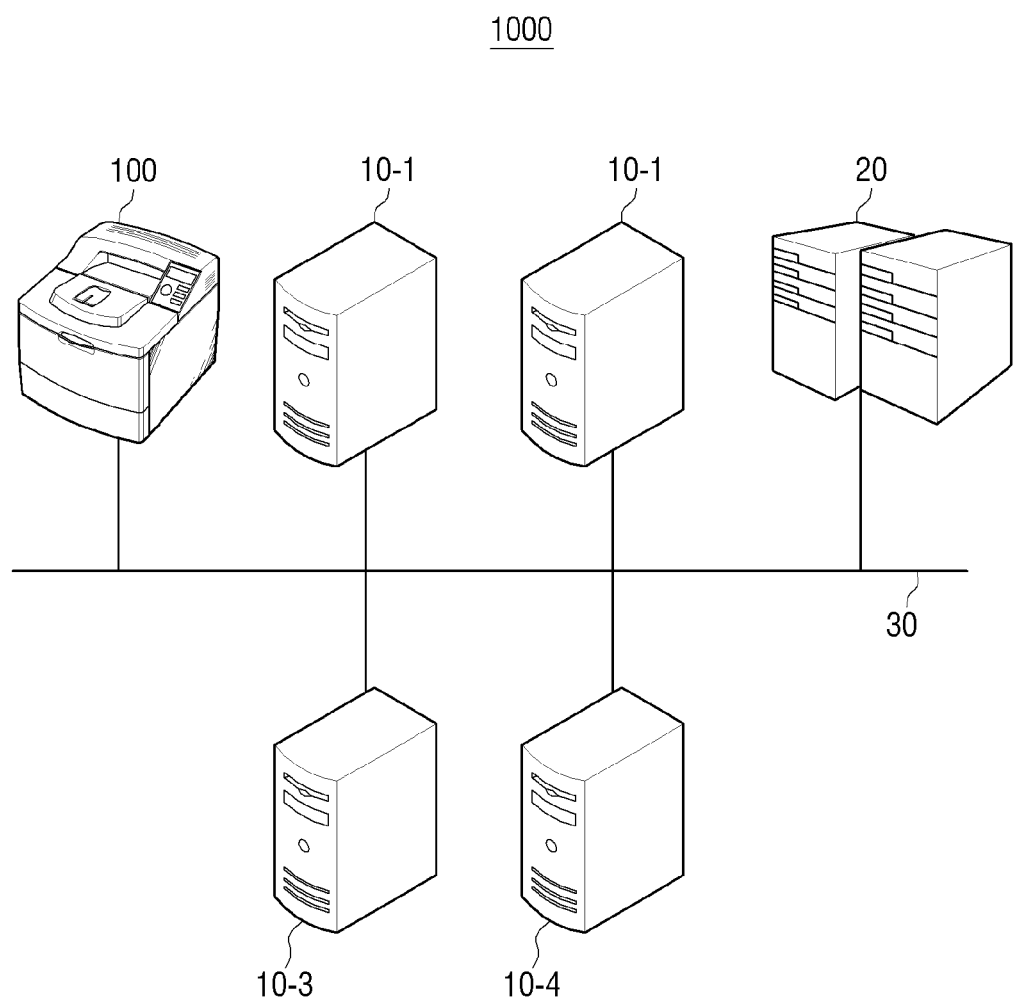
FIG. 1 is a view illustrating an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating an image forming system according to an exemplary embodiment of the present general inventive concept.

Referring to FIG. 1, the image forming system includes an image forming apparatus 100, a printing control terminal apparatus 10 (10-1, 10-2, 10-4, 10-4), and a management server 20.

The printing control terminal apparatus 10 may transmit a job performance command to the image forming apparatus 100. Herein, the printing control terminal apparatus 10 may be a PC, a notebook PC, a mobile phone, a smart phone, a PMP, an MP3, and so on.

Specifically, when receiving a printing command from a user, the printing control terminal apparatus 10 may generate a printing job to perform a printing operation and transmit the printing job generated according to the printing performance command to the image forming apparatus 100. More specifically, the printing control terminal apparatus 10 may convert a document file written by a user to printing data which can be recognized by an image forming apparatus (for example, the image forming apparatus) and transmit the converted printing data to the image forming apparatus 100. Such a conversion process may be performed by a printer driver within the printing control terminal apparatus 10.

If the image forming apparatus 100 is capable of performing fax transmission, the printing control terminal apparatus 10 may generate fax data for the fax transmission and transmit the generated fax data as a job performance command.

If the image forming apparatus 100 is capable of performing a scanning operation, the printing control terminal apparatus 10 may receive scanning data generated by the image forming apparatus 100.

In addition, the printing control terminal apparatus 10 may transmit user information to the image forming apparatus 100 in response to a user information request. Specifically, if a user information request is received from the image forming apparatus 100, the printing control terminal apparatus 10 may display a user interface window to receive user information from a user. Herein, the user information refers to information to identify a user who requests job performance and may include a user name, an employee number, an identification (ID), a password, a user mobile phone number, and so on.

If the user information is input through the displayed user interface window, the printing control terminal apparatus 10 may transmit the input user information to the image forming apparatus 100. The user interface window which can be generated by the printing control terminal apparatus 10 and displayed on a display unit of the printing control terminal apparatus 10 will be explained later with reference to FIGS. 9, 12 and 18.

Meanwhile, the user interface window which can be displayed on the printing control terminal apparatus 10 may be a user interface window provided by a printer driver of the printing control terminal apparatus 10, and may be a user interface window provided by the image forming apparatus 100.

In the above exemplary embodiment, user information may be received from a user after a job performance command is transmitted. However, the present general inventive concept is not limited thereto. The user information may be received and stored in advance. For example, the user information may be input in advance during a log-on stage in a process of booting the printing control terminal apparatus 10 or during a log-on stage for network connection. In this case, the printing control terminal apparatus 10 may transmit the user information together with a job performance command.

The management server 20 stores user account information. Specifically, the management server 20 may perform user authentication using the stored user account information and received user information in response to an authentication request from the image forming apparatus 100 and transmit an authentication result to the image forming apparatus 100. The management server 20 which is connected to the image forming apparatus 100 is a solution server which may manage a function of the connected image forming apparatus 100, charging and security setting. Meanwhile, in the exemplary embodiment, the management server 20 may manage only the function of the connected image forming apparatus 100, charging and security setting. However, the present general inventive concept is not limited thereto. The management server 20 may also perform other functions than the above-described management functions provided by a general solution server.

In addition, the management server 20 stores user authority information. Specifically, the management server 20 may store information regarding whether a user has authority for each function of the image forming apparatus 100 corresponding to a user account and/or information regarding allocation for each authority. In this case, if an authentication request is received from the image forming apparatus 100, the management server 20 may perform authentication of a user and at the same time, may determine whether the authenticated user is authorized to request a job.

If the image forming apparatus 100 is connected to the printing control terminal apparatus 10, an operation may be performed according to a request from the printing control terminal apparatus 10. Specifically, if the image forming apparatus 100 is in a power saving mode and a job performance command is received from the printing control terminal apparatus 10, authentication may be performed for the printing control terminal apparatus 10 which has transmitted the job performance command and/or a user who inputs the job performance command.

Based on the authentication result, if it is determined that the request is from an authenticated user or an authenticated printing control terminal apparatus 10, the image forming apparatus 100 may convert an operation mode from the power saving mode to a normal mode and perform a function corresponding to the job performance command.

However, if it is determined that the request is from an unauthenticated printing control terminal apparatus 10 or an unauthenticated user, the image forming apparatus 100 does not perform the requested job and also, does not convert an operation mode but maintains a current mode, for example, the power saving mode. The detailed operation and configuration of the image forming apparatus 100 for the above operation will be explained later with reference to FIGS. 2 to 5.

As such, the image forming system includes the image forming apparatus 100 to perform authentication processing in response to a job performance command of the printing control terminal apparatus 10 and thus, security can be improved. In addition, even if a job performance command is received in a power saving mode, the image forming apparatus 100 does not perform a wake-up operation immediately and instead, performs an authentication operation first. Accordingly, an unnecessary wake-up operation may be prevented regarding an operation request from an unauthenticated user or an unauthenticated apparatus, preventing unnecessary power consumption of the system as well.

Meanwhile, in the above description regarding FIG. 1, four printing control terminal apparatuses 10-1, 10-2, 10-3, 10-4, one management server 20, and one image forming apparatus 100 are connected to each other. However, the present general inventive concept is not limited thereto. It is possible that more than four printing control terminal apparatuses may be connected to an image forming apparatus, and a plurality of image forming apparatuses may be connected to one or more printing control terminal apparatuses. In addition, the management server 20 may not be included depending on a system environment. In this case, the image forming apparatus 100 and/or the printing control terminal apparatus 10 may include the function of the management server 20.

In addition, each apparatus may be connected to each other not only directly but also indirectly through a router and another management server depending on exemplary embodiments. In the above exemplary embodiment, each apparatus is connected to each other via cable, but each apparatus may be connected wirelessly.

Further, in the above exemplary embodiment, the printing control terminal apparatus 10 converts a document file to printing data and provides the printing data to the image forming apparatus 100. However, the present general inventive concept is not limited thereto. It is possible that if the image forming apparatus 100 does not support direct-printing, the document file may be transmitted directly to the image forming apparatus 100 without conversion.

Figure 2:
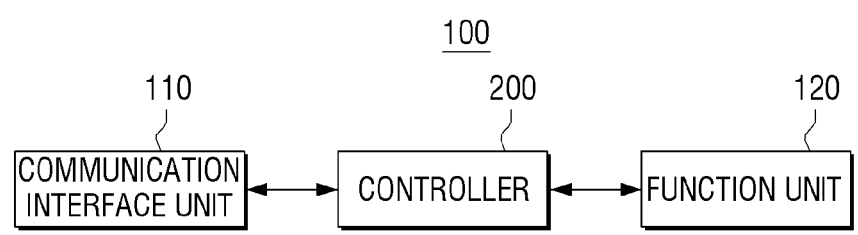
FIG. 2 is a block diagram briefly illustrating an image forming apparatus according to an exemplary embodiment of the present general inventive concept.

FIG. 2 is a block diagram illustrating the image forming apparatus 100 of FIG. 1 according to an exemplary embodiment of the present general inventive concept.

Referring to FIG. 2, the image forming apparatus 100 includes a communication unit 110, a function unit 120 and a controller 200.

Herein, the image forming apparatus 100 may be a copy machine, a printer, a fax machine, and a Multi-Function Peripheral (MFP) which performs the above functions in a single device. The image forming apparatus 100 may include a plurality of operation modes. Herein, the operation modes include a normal mode where all power is supplied such that an operation is performed normally, and a power saving mode which is a stand-by state.

The communication interface unit 110 is formed to connect the image forming apparatus 100 to an external apparatus, and may be connected not only through a Local Area Network (LAN) and an Internet network but also through a Universal Serial Bus (USB) port and a wireless port. Herein, the external apparatus may be the printing control terminal apparatus 10 of a Personal Computer (PC) as described above.

The communication interface unit 110 may receive a state request signal from an external apparatus, and transmit information regarding the state of the image forming apparatus to the external apparatus which has sent the state request signal in response to the state request signal. For example, a printer driver of the printing control terminal apparatus 10 may comprise a smart panel.

Herein, the smart panel refers to a panel to display a state of an image forming apparatus in a printing control terminal apparatus (or in a host apparatus) and to periodically identify the state of the image forming apparatus through a USB communication method or a LAN communication method and displays the state. Accordingly, a user may identify a printing state, paper state, toner state, power on/off state, etc. of the image forming apparatus 100 in a printing control terminal apparatus through the smart panel.

The communication interface unit 110 may receive a job performance command from an external apparatus for example, the printing control terminal apparatus 10, and may receive data related to the job performance (for example, printing data). Meanwhile, in the above exemplary embodiment, an operation of receiving a job performance command may be performed separately from an operation of receiving printing data. However, the present general inventive concept is not limited thereto. It is possible that a job performance command and printing data may be received simultaneously, and the operation of receiving printing data may be regarded as an operation of receiving a job performance command.

Herein, the printing data may be data of printing language such as Postscript (PS), Printer Control Language (PCL) and etc., and if direct-printing is supported by the image forming apparatus 100, may be PDF, XPS, BMP, JPG, and etc.

In addition, the communication interface unit 110 may transmit a job performance result to an external apparatus, for example, the printing control terminal apparatus 10. For example, if a job requested from the external apparatus is a scanning job, the communication interface unit 110 may transmit a scanning result of the scanning job to the external apparatus which has requested the scanning job. If a job requested from an external apparatus is a printing job, the communication interface unit 110 may inform the corresponding external apparatus that the printing job has been completed upon completion of the printing job.

In addition, the communication interface unit 110 may recognize address information of an external apparatus, for example, the printing control terminal apparatus 10. Specifically, the communication interface unit 110 may recognize an IP address and/or a MAC address of the external apparatus which has transmitted a job performance command. More specifically, the communication interface unit 110 may recognize an IP address and/or a MAC address of the external apparatus using a job performance command of a packet (a packet transmitting a job performance command or printing data) transmitted from the external apparatus or sender information of the packet to transmit a job performance command or printing data thereto.

The communication interface unit 110 may request an external apparatus, for example, the printing control terminal apparatus 10, to transmit user information. Specifically, if authentication is processed using user information, the communication interface unit 110 may request the external apparatus to transmit the user information. Herein, the user information represents information to identify a user who has requested job performance, and may be a user name, an employee number, ID, a password, and so on. Meanwhile, if the user information is received along with a job performance command, the communication interface unit 110 may not request an external apparatus to transmit the user information.

In response to the above request, the external apparatus may display a user interface window to receive user information, receive the user information through the displayed user interface window, and transmit the received user information to the image forming apparatus 100. Such an operation may be performed in a printer driver of the printing control terminal apparatus 10.

Meanwhile, if a printer driver is not installed in the external apparatus or if the external apparatus is a smart phone where a printer driver may not be installed, the communication interface unit 110 may provide a user interface window image or a web page to receive user log-in information. In this case, the image forming apparatus 100 may include a web server (not illustrated) which provides a web page to the external apparatus.

In addition, the communication interface unit 110 may transmit user information to the management server 20. Specifically, if user account information is not stored in the image forming apparatus 100, the communication interface unit 110 may transmit user information received from an external apparatus to the management server 20 to request user authentication.

In response to the above request, the communication interface unit 110 may receive an authentication result from the management server 20. Meanwhile, in the above exemplary embodiment, if user account information is not stored in the image forming apparatus 100, the management server 20 is requested to perform user authentication. However, even if user account information is stored in the image forming apparatus 100, the management server 20 may be requested to perform user authentication. Specifically, the user information stored in the image forming apparatus 100 and the user account information stored in the management server may be different from each other, and thus the image forming apparatus 100 may transmit the user information to the management server and request the management server to perform authentication in order to perform additional authentication procedures.

The function unit 120 performs predetermined functions. Specifically, the function unit 120 may be an image forming unit which outputs printing data, and may include a fax processing unit to perform a fax function if the image forming apparatus supports the fax function of transmitting and receiving a fax. If the image forming apparatus 100 supports a scanning function, the function unit 120 may include a scan processing unit to perform the scanning function.

The controller 200 controls each component of the image forming apparatus 100. Specifically, the controller 200 may determine conversion of operation modes of the image forming apparatus 100. More specifically, the controller 200 may convert a normal mode to a power saving mode if one or more predetermined conditions, for example, when there is no command for a predetermined time, are satisfied. However, the present general inventive concept is not limited thereto. It is possible that there may be various events for the mode conversion. In this case, the controller 200 may use a state analyzing unit to identify whether there is an operation of the function unit 120.

If the one or more predetermined conditions are satisfied, the controller 200 converts a power saving mode to a normal mode. For example, in the event of a panel key input, an authenticated job performance request, a fax ring, and etc., the controller 200 may convert a power saving mode to a normal mode.

Herein, the normal mode refers to a mode where the image forming apparatus 100 performs a normal operation, and the power saving mode refers to an operation mode where power to most of the modules is cut off or minimized in order to minimize power consumption when the system performs no operation). In the power saving mode, power supply to a predetermined unit, for example, a main memory (generally, an external DRAM), may be cut off, or the main memory is put into a self-refresh state and then, an unused internal memory (generally, an internal SRAM) within a System on Chip (SoC) may be used to drive programs in order to realize a further low standby power. For example, an SRAM may use small amount of memory, approximately 128 KB. However, in some cases, an SDRAM may be used, and a ROM may be used along with an SRAM or an SDRAM.

Although the exemplary embodiment illustrates that only a normal mode and a power saving mode exist as operation modes, the present general inventive concept is not limited thereto. It is possible that the power saving mode may be realized as a plurality of power saving modes. For example, the image forming apparatus 100 may have the following four operations of the power saving modes.

[First Power Saving Mode]

If a signal to request job performance is not input through the communication interface unit 110 for a predetermined first period in a normal mode, the image forming apparatus 100 may convert the normal mode to the first power saving mode.

Figure 3:
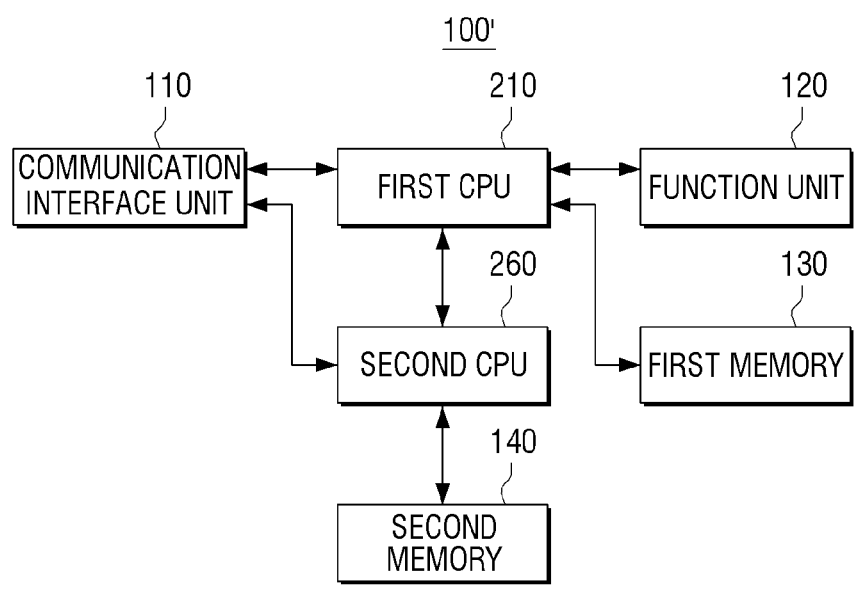
FIG. 3 is a block diagram illustrating an image forming apparatus according to an exemplary embodiment of the present general inventive concept.

Herein, the first power saving mode refers to a mode in which an operation frequency of a non-volatile memory in a first memory 130 of FIG. 3 is lowered to a minimum operation frequency, and an operation frequency of a central processing unit (CPU) in the controller 200 is lowered to a first operation frequency. For example, if the operation frequency of a volatile memory is 300 MHz, a minimum operation frequency of the volatile memory may be 133 MHz, and if the maximum operation frequency of the CPU is 600 MHz, the first operation frequency of the CPU may be 133 MHz.

[Second Power Saving Mode]

In the first power saving mode, if an external signal to convert the power saving mode to a normal mode (for example, a job performance command and image data to be received from the printing control terminal apparatus 10) is not received for a predetermined second period, the image forming apparatus 100 may convert the first power saving mode to the second power saving mode.

Herein, the second power saving mode refers to a mode in which a program jump is performed to allow the CPU to operate using information copied in the internal memory and the non-volatile memory is converted from a normal operation mode to a self-refresh mode.

In this case, if an external signal to convert the second power saving mode to the normal mode is not received in the interface unit 110, the non-volatile memory may maintain the self-refresh mode even if another external signal is received.

[Third Power Saving Mode]

In the second power saving mode, if an external signal to convert the power saving mode to a normal mode is not received for a predetermined third period, the image forming apparatus 100 may convert the second power saving mode to the third power saving mode.

Herein, the third power saving mode refers to a mode in which the operation frequency of the CPU is lowered to a minimum operation frequency, and power supply to a function unit and an operation module to perform an image forming job is cut off, respectively. For example, if the first operation frequency of the CPU is 133 MHz, the minimum operation frequency of the CPU may be 33 MHz.

When the power saving mode is converted to the third power saving mode, the power of the function unit and the operation module is turned off and the operation frequency of the CPU is lowered to the minimum operation frequency, and thus, power consumption may be further reduced in comparison with the second power saving mode.

Meanwhile, the operation of cutting off power provided to the function unit may be performed in the second power saving mode. In addition, in the third power saving mode, the operation frequency of the communication interface unit 110 may also be changed. For example, the operation frequency of the communication interface unit 110 may be changed from 133 MHz to 33 MHz.

[Fourth Power Saving Mode]

In the third power saving mode, if an external signal to convert the power saving mode to a normal mode is not received for a predetermined fourth period, the image forming apparatus 100 may convert the third power saving mode to the fourth power saving mode.

The fourth power saving mode refers to a mode in which a power supply to the first memory 130 is cut off. As the non-volatile memory is turned off, power consumption may be further reduced than in the third power saving mode.

Meanwhile, the various operation frequency and power values in the above exemplary embodiments are only examples, and the present general inventive concept is not limited thereto. It is possible that they may vary depending on characteristics of the image forming apparatus 100 and/or a user or design preference.

In the above exemplary embodiment, there are four operations of the power saving modes, but this is only an example. It is possible that one or more different power saving modes in addition to the four operations may also be applied as the power saving modes. In this case, the characteristics and the number of components which are operated in a plurality of power saving modes and the operation frequency and power values may be variable according to a design or user preference. If the controller 200 includes a plurality of CPUs as described below, a power saving mode in which power to a main controller is cut off and only an auxiliary CUP is operated to be further used.

In addition, the controller 200 may control a power state of each component of the image forming apparatus 100 according to a determined operation mode. Specifically, if the determined operation mode is a normal mode, the controller 200 may provide power to the function unit 120. If a determined operation mode is a power saving mode, the controller 200 may cut off power to the function unit 120.

If a job performance command is received from an external apparatus, for example, the printing control terminal apparatus 10, through the communication interface unit 110, the controller 200 may perform authentication of the external apparatus. Specifically, if a job performance command is received in a normal mode, the controller 200 may perform the authentication of the external apparatus while maintaining the normal mode. The authentication in the normal mode may be performed in the same way as in the power saving mode. The authentication processing operation will be explained later with reference to FIGS. 6 to 20 which explain an authentication processing operation in a power saving mode.

When the job performance command is received in the power saving mode, the controller 200 may perform the authentication of the external apparatus before converting the operation mode of the image forming apparatus 100 from the power saving mode to the normal mode. The specific authentication processing method will be explained later with reference to FIGS. 6 to 20.

The controller 200 controls the function unit 120 to perform a corresponding to the job performance command. Specifically, the controller 200 may control the function unit 120 to perform a function corresponding to a job performance request (or command).

In this case, if the operation mode of the image forming apparatus 100 is a power saving mode, the controller 200 may convert the operation mode of the image forming apparatus 100 to a normal mode, that is, may supply power to the function unit 120 and perform initialization. Subsequently, the controller 200 may control the function unit 120 to perform a function corresponding to the job performance request. Meanwhile, in the above exemplary embodiment, the controller 200 wakes up the function unit 120, but the operation of waking up the function unit 120 may be performed using a hardware component (for example, a state analyzing unit 190) which will be explained later with reference to FIG. 5.

In this case, the controller 200 may wake up or preferentially wake up only the component of the function unit 120 corresponding to the function requested from a user. The function unit 120 may include an image forming unit, a scanning unit, and a fax processing unit, and a job performance command may be a command to use only one of the components. Accordingly, the controller 200 may control only the component of the function unit 120 corresponding to the job performance command to perform the wake-up operation. For example, if a job performance command is a printing command, the controller 200 may supply power only to the image forming unit and perform initialization, and may not supply power to the scanning unit and the fax processing unit.

By the above operation, unnecessary power consumption in the normal mode may be prevented, and a job requested from a user may be performed in a more rapid manner since it takes less time to initialize only the function corresponding to the job requested from the user than initializing all components thereof.

In addition, the function unit 120 may include an image forming unit, a scanning unit, and a fax processing unit, and if a job performance command is a printing command, the controller 200 may supply power to the image forming unit, the scanning unit, and the fax processing unit, but perform initialization of the image forming unit first. In this case, initialization may not be performed on the scanning unit and the fax processing unit. By this operation, a job requested from a user may be performed in a more rapid manner.

As such, when receiving a job performance request in a power saving mode, the image forming apparatus 100 according to an exemplary embodiment performs authentication before performing an wake-up operation, and thus an unnecessary wake-up operation regarding a job request from an unauthenticated user or an unauthenticated apparatus may be prevented, preventing unnecessary power consumption and reducing power consumption.

In the above exemplary embodiment, when receiving a file from an external apparatus, the image forming apparatus 100 performs the above-described authentication, but if a user wishes to print or copy a file pre-stored in the image forming apparatus 100, the above-described authentication operation may be performed by a manipulation of an interface unit from the user, using information input through the interface unit and information stored therein.

In addition, in the above exemplary embodiment, the controller 120 may include one component. However, the present general inventive concept is not limited thereto. The controller 200 may include a first central processing unit (CPU) to support a normal mode and a second CPU to support a power saving mode, which will be explained with reference to FIGS. 3 to 5.

FIG. 3 is a block diagram illustrating an image forming apparatus 100' according to an exemplary embodiment of the present general inventive concept.

Referring to FIG. 3, the image forming apparatus 100' includes the communication unit 110, the function unit 120, a first memory 130, a second memory 140, a first CPU 210, and a second CPU 260.

The communication interface unit 110 and the function unit 120 perform the same functions as those illustrated in FIG. 2, and thus further explanation may not be provided here.

The first memory 130 (or main memory) may be realized as a non-volatile memory which is used for operations in a normal mode. For example, the first memory 130 may be a Dynamic RAM (DRAM), and may store a program to support LAN communication in a normal mode (for example, a USB driver), an application, external apparatus information, user information, and so on.

Herein, the external apparatus information is an IP address or a MAC address information of an external apparatus which may use or control the image forming apparatus 100. The user information is information regarding a user which may use or control the image forming apparatus 100. Examples of the external apparatus information and the user information will be explained with reference to FIGS. 21 to 26.

The first memory 130 may store various programs necessary to realize functions of the image forming apparatus 100', various data generated in a process of performing the operations of the image forming apparatus 100', and state information of the image forming apparatus 100'.

The first memory 130 may operate normally in an operation mode with a normal power, but may not operate normally in a power saving mode since power may be cut off, and/or an operation frequency may be lowered than in a normal operation mode, or the first memory 130 may be put into a self-refresh state.

Meanwhile, in the above exemplary embodiment, the first memory 130 operates normally in an operation mode, but if the first memory 130 includes a plurality of memory modules, a portion of the memory modules may operate in a state like in a power saving mode during an operation mode, which will be explained later with reference to FIG. 27.

The second memory 140 (or auxiliary memory) may be used for operations in a power saving mode to be performed using low power than in a normal mode. For example, a program to control a power saving mode may include at least one of a routine to determine whether a signal to a LAN interface is input, a routine whether a signal to a USB interface is input, a routine to perform an operation according to a USB control signal or a LAN control signal, a routine to perform authentication, a routine to convert to a normal mode for wake-up, and a routine to perform communication with a management server.

The second memory 140 stores a program, an application, address information, user information, and etc. to support a power saving mode, and may be realized as at least one of a Static RAM (SRAM) and a Synchronous Dynamic Random Access Memory (SDRAM). In addition, a RAMBus, DRAM, DDR-SDRAM, and etc., may also be used.

In addition, at least one of a Read Only Memory (ROM) and a flash memory may be used to store a code necessary to realize a normal mode.

According to an exemplary embodiment, the second memory 140 may be realized as an SRAM. In this case, the SRAM may be used to copy and execute a code necessary to realize a normal mode stored in a DRAM, a ROM, or a flash memory. In addition, the second memory 140 may be realized as an SRAM and may be used to execute a code necessary to realize a power saving mode stored in a ROM or a flash memory.

Further, the second memory 140 may be used together with the first memory 130 in a normal mode. That is, an SRAM which is usable as a buffer during an image processing in a normal mode may be usable as the second memory 140 in a power saving mode. It is possible that the power supply to the second memory 140 may be cut off in an operation mode, or the second memory 140 may operate using low operation frequency than in a normal operation mode.

Hereinafter, characteristics of each memory will be explained briefly for better understanding of the exemplary embodiment.

SRAM may retain data while power is being supplied. Since SRAM does not require a re-writing operation periodically, data may be retained even with only one writing. SRAM is a small-scale memory with a fast operation speed, but is more expensive than a DRAM. Thus, just like a cache memory, the SRAM is used for an operation which requires a fast speed but low capacity.

Unlike SRAM, DRAM should perform a rewriting operation periodically in order to retain data. Accordingly, DRAM is a large-scale memory with relatively slower speed than SRAM, and is usable as a main memory in most of systems.

SDRAM operates synchronously, that is, in line with a system clock. The SDRAM may adapt to a speed of a system bus up to 200 MHz, and has an effect of improving a system speed as it operates in a dependent manner with respect to a system clock.

The first CPU 210 (or main CPU) performs an operation using the first memory 130 in a normal mode, and may be inactivated if the normal mode is converted to a power saving mode.

In addition, the first CPU 210 may determine whether it is required to convert a normal mode to a power saving mode. If the function unit 120 does not operate and a predetermined time elapses after an operation is performed, the first CPU 210 may determine it is necessary to convert an operation state of the image forming apparatus 100' to a power saving mode. In this case, the first CPU 210 may determine whether the function unit 120 is in operation using the state information of the function unit 120 stored in the state analyzing unit 190 which will be explained later.

In addition, the first CPU 210 may convert a normal mode to a power saving mode when one or more predetermined conditions are satisfied. The first CPU 210 may back up current state information of the function unit 120 in the second memory 140 and may convert a normal mode to a power saving mode by notifying the second CPU 260 of the conversion to the power saving mode. In the above exemplary embodiment, the first CPU 210 backs up the state information of the function unit 120 while converting the normal mode to the power saving mode, but such an operation may be performed in a separate component (for example, the state analyzing unit in FIG. 5).

If a job performance command is received from an external apparatus, the first CPU 210 may perform authentication of the external apparatus of a user who has requested the job performance. If a job performance command is received in a normal mode, the first CPU 210 may perform authentication of the external apparatus while maintaining the normal mode.

Meanwhile, in the exemplary embodiment, the first CPU 210 performs authentication in a normal mode, but if the second CPU 260 operates in a normal mode, authentication may be performed in the second CPU 260 in the normal mode. A method of performing authentication in a normal mode may be the same as a method of performing authentication in a power saving mode, and thus further explanation will not be provided.

The first CPU 210 controls the function unit 120 to perform a function corresponding to the job performance command. The first CPU 210 may control the function unit 120 to perform a function corresponding to the job performance request received from the authenticated external apparatus based on the authentication result. For example, if a ring signal is received through a fax transmission/reception unit 114 of FIG. 4 and a mode is converted to a normal mode under the control of the second CPU 260, the first CPU 210 controls the function unit 120 to print fax data transmitted through the fax transmission/reception unit 114 and the second CPU 260.

The second CPU (or auxiliary CPU) performs an operation using the second memory 140 in a power saving mode. If a state request signal is input through the communication interface unit 110 in a power saving mode, the second CPU 260 may perform an operation corresponding to the state request signal using the second memory 140 while maintaining the power saving mode. The second CPU 260 has lower resources and lower power consumption than the first CPU 210.

In addition, if a job performance command is received through the communication interface unit 110 in a power saving mode, the second CPU 260 may perform authentication of the external apparatus which has transmitted the job performance command and convert the power saving mode to a normal mode by activating the first CPU 210 according to the authentication result. Meanwhile, if it is determined that the job performance command is received from an authenticated external apparatus based on the authentication result, the power saving mode may be converted to the normal mode.

In a power saving mode, the second CPU 260 may cut off power to the first CPU 210, lower the operation frequency of the first memory 130, maintain the self-refresh mode of the first memory 130, and/or cut off power to the first memory 130.

In addition, the second CPU 260 may convert a power saving mode to a normal mode if one or more predetermined conditions are satisfied. For example, in the case of a printer, a power saving mode may be converted to a normal mode if one or more events, such as panel key input, authenticated job performance request and fax ring, occur.

Meanwhile, as illustrated in FIG. 2, if a normal mode and a power saving mode are controlled by a single component, that is, a main firmware to control a normal mode and a micro firmware to control a power saving mode are realized as a single chip, a power saving mode may be realized by lowering the frequency of the main controller as described above or by configuring a gated clock when designing the main controller to cut off a clock input to blocks (components or internal elements) which do not operate in the power saving mode.

In this case, the micro firmware may be mounted in the internal memory (SRAM) of the main controller. SRAM may retain contents without refresh (for example, without recharging), and thus, has a faster response speed than Dynamic RAM (DRAM), allowing fast conversion from a power saving mode to a normal mode.

Meanwhile, if a main controller supporting a normal mode and a sub controller supporting a power saving mode are provided separately as illustrated in FIG. 3, that is, a main firmware to control a normal mode and a micro firmware to control a power saving mode are realized as separate chips, a method of cutting off power to components except for the sub controller may be used in a power saving mode.

In this case, the sub controller may check whether there is an interruption in the communication interface unit 110 in a power saving mode, and if an interruption occurs, process an event regarding the corresponding interruption, and activate the main controller according to authentication result.

In the above exemplary embodiment, only brief configuration of the image forming apparatus 100' has been illustrated and explained, but the image forming apparatus 100' may further comprise other components. The detailed configuration of the image forming apparatus 100' will be explained with reference to FIG. 4.

Figure 4:
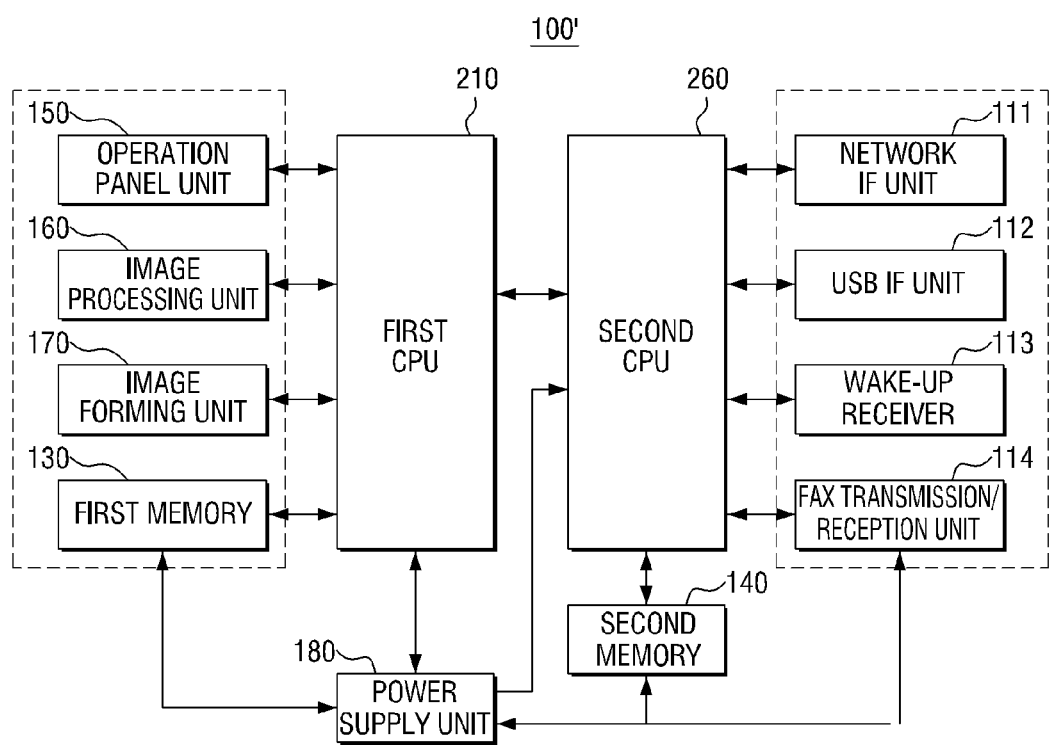
FIG. 4 is a block diagram illustrating an image forming apparatus according to an exemplary embodiment of the present general inventive concept.

FIG. 4 is a block diagram illustrating an image forming apparatus 100' according to an exemplary embodiment of the present general inventive concept.

Referring to FIG. 4, the image forming apparatus 100' includes a power supply unit 180, an operation panel unit 150, an image processing unit 160, an image forming unit 170, the first memory 130, the first CPU 210, a network interface (IF) unit 111, a USB IF unit 112, a wake-up receiver 113, a fax transmission/reception unit 114, the second memory 140, and the second CPU 260.

As the operations of the first memory 130, the second memory 140, the first CPU 210, and the second CPU are the same as those in FIG. 3, further description will not be provided here.

The network IF unit 111 is a communication IF, and provides a network connector to communicate with an external network. For example, the network IF unit 111 is connected to an interface card through which transmitting/receiving data via network and providing Internet function are performed. The network IF 11 may be part of the communication interface unit 110 which has been explained with reference to FIGS. 2 and 3. That is, the communication interface unit 110 includes the network IF unit 111, and may perform the above-described functions.

The USB IF unit 112 is an interface unit to connect a USB device or a USB cable to the second CPU 260, and to connect various devices, such as a USB memory, a personal computer, and a laptop thereto. The data provided from an external memory device through the USB IF unit 112 may be output to a USB device module 264 of FIG. 5. The USB IF unit 112 may be part of the communication interface unit 110 which has been explained with reference to FIGS. 2 and 3. That is, the communication interface unit 110 includes the USB IF unit 111, and may perform the above-described functions in a USB method using the USB IF unit 112.

The wake-up receiver 113 is a user interface through which a user requests for entering into a normal mode when the image forming apparatus 100' is in a power saving mode, and outputs a request signal to the second CPU 260. The wake-up receiver 113 may be realized as a physical button formed on the image forming apparatus 100' or a sensor which receives a signal input from a remote controller (not illustrated).

The fax transmission/reception unit 114 is a circuit to perform fax transmission/reception, and if a ring signal is received, may inform the second CPU 260 that the ring signal has been received.

The operation panel unit 150 which is a user interface includes a plurality of function keys and a touch screen and etc. to receive a user command from a user, and comprises a display panel to display a state of the image forming apparatus 100'.

The image processing unit 160 processes printing data, scanning data, or fax data to data in an appropriate format. For example, in a case of printing data, the image processing unit 160 converts the printing data to bitmap data using a corresponding emulator. For example, the printing data may be input to a personal computer connected through the USB IF unit 112, and the fax data may be input through the fax transmission/reception unit 114.

The image processing unit 160 may be part of the function unit 120 which was explained above with reference to FIGS. 2 and 3. That is, the function unit 120 may include the image processing unit 160, and if printing data is received, may convert the data using the image processing unit 160.

The image forming unit 170 forms an image from data processed by the image processing unit 160. For example, the image forming unit 170 may print an image scanned by the scanning unit (not illustrated) or an image received through the fax transmission/reception unit 114 on paper, or may print printing data which is converted to bitmap data by the image processing unit 160 on paper.

The image forming unit 170 may be part of the function unit 120 which was explained above with reference to FIGS. 2 and 3. That is, the function unit 120 may include the image forming unit 170, and if printing data is received, may perform a printing operation using the image forming unit 170.

The power supply unit 180 provides power to various units of the image forming apparatus 100', for example, the function units 120, 150, 160, 170, the first CPU 210, the second CPU 260, the first memory 130 and a plurality of communication IF units 111, 112, 113, 114 when the image forming apparatus 100' is in a normal mode, and cuts off power to the function unit 120, the first CPU 210, and the first memory 130, for example, when the image forming apparatus 100' is in a power saving mode.

As described above, in the above exemplary embodiment, a power supply to the first CPU 210 is completely cut off and a power supply to the second CPU 260 in a low power is maintained in a power saving mode, thereby minimizing power consumption.

In addition, as data input from an external apparatus is transmitted to the second CPU 260, the input data may be processed efficiently even in a power saving mode. That is, if the input data can be processed by the second CPU 260, the input data are processed by the second CPU 260 while the power saving mode is maintained, and if the operation of the first CPU 210 is required, the power saving mode is converted to a normal mode selectively, thereby minimizing power consumption.

Meanwhile, in the above exemplary embodiment, only two memories are provided, but the image forming apparatus 100 may further comprise addition storage elements such as ROM or HDD to store programs which are in operation in the normal mode and the power saving mode of the image forming apparatus 100.

Figure 5:
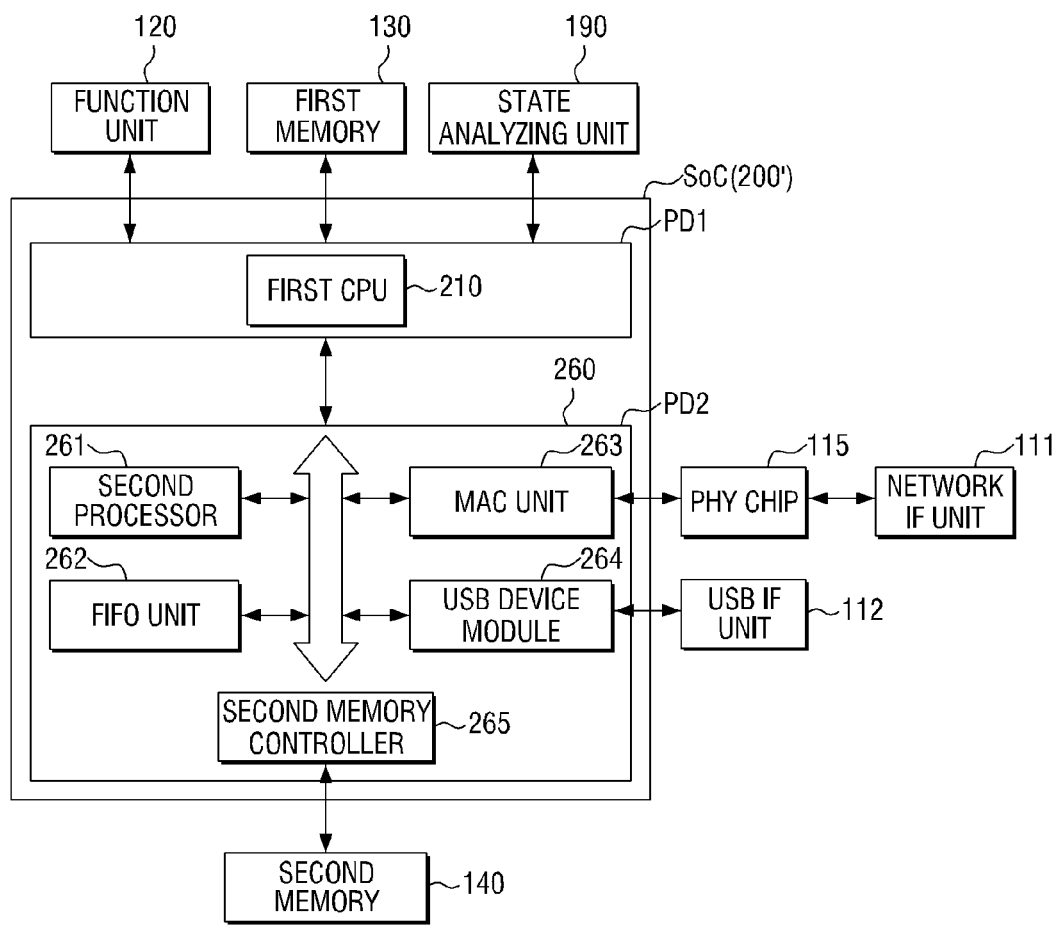
FIG. 5 is a block diagram illustrating configuration of a second CPU of the image forming apparatus of FIG. 4.

FIG. 5 is a block diagram illustrating the second CPU 260 of the image forming apparatus 100' of FIG. 4 according to an exemplary embodiment of the present general inventive concept.

Referring to FIG. 5, the image forming apparatus 100' may include a system on chip (SoC) 200', the network IF unit 111, the USB IF unit 112, a PHY chip 115, the function unit 120, the first memory 130, the second memory 140, and the state analyzing unit 190. Each component of FIG. 5 is connected to each other via a bus so as to communicate with each other, and the power supply unit 180 (not shown) may be connected in order to provide power to each component. For convenience of explanation, the wake-up receiver 113, the fax transmission/reception unit 114, the operation panel unit 150, the image processing unit 160, and the image forming unit 170 are not illustrated.

The configurations of the network IF unit 111, the USB IF unit 112, the function unit 120, the first memory 130, and the second memory 140 are the same as those in FIG. 4, and thus further description will not be provided.

The physical layer (PHY) chip 115 outputs data received from a network through the network IF unit 111 to the Soc 200' using a protocol corresponding to the physical layer of Open Systems Interconnection (OSI).

The state analyzing unit 190 may analyze the state of the function unit 120 in a normal mode periodically and store the state information in the function unit 120. In addition, the state analyzing unit 190 may initialize the function unit 120 when a power saving mode is converted to a normal mode. The detailed operations of the state analyzing unit 190 will be explained later with reference to FIGS. 29 and 30. Meanwhile, in the exemplary embodiment, the state analyzing unit 190 is formed outside the SoC 200', but the state analyzing unit 190 may be formed inside the SoC 200'.

The SoC 200' may include the first CPU 210 and the second CPU 260. As the operations of the first CPU 210 and the second CPU 260 have been explained in detail in the above description, a specific configuration of the second CPU 260 will be explained.

The second CPU 260 may include a second processor 261, First In First Out (FIFO) unit 262, a media access control (MAC) unit 263, the USB device module 264, and a second memory controller 265.

The second processor 261 reads out data output from the MAC unit 263 and stored in the second memory 140 and provide the data to the first CPU 210. Meanwhile, the date stored in the second memory 140 may be provided to the first CPU 210 through a separate MAC. Hereinafter, the function of transferring data input through the network IF unit 111, the USB IF unit 112, a wake-up receiver 354, and a fax transmission/reception unit 355 to the first CPU 210 is referred to as a relay unit. A data bus may relay input data in the form of MII, GMII or RGMII to the first CPU 210.

In a normal mode, the second processor 261 may analyze data input through the MAC unit 263, the USB device module 264, and etc., and transmit the data which should be processed under the control of the first CPU 210 to the first CPU 210 and process data which can be processed therein. The second processor 261 may be realized, for example, as an Advanced RISC Machine (ARM) core.

In this case, if it is determined that data should be processed under the control of the first CPU 210, that is, if the data is determined to a job performance command, the second processor 261 may perform authentication using user information or apparatus information stored in a second memory 380. Alternatively, the second processor 261 may request authentication by transmitting the information regarding the apparatus or the user that has requested the job performance command to a management server.

In addition, if a signal to request conversion to a power saving mode is received from the first CPU 210, the second processor 261 outputs a cutoff control signal to the power supply unit 180. The cutoff control signal is a signal to cut off power supplied from the power supply unit 180 to the first CPU 210 and the function unit 120. Accordingly, the power supply unit 180 may provide a minimum power to the second CPU 2600 and components 111~115, 140 which are connected to the second CPU 260, and turn off power to the first CPU 210 and components 120, 130, 190 which are connected to the first CPU 210. As such, the image forming apparatus 100' may convert a normal mode to a power saving mode.

In a power saving mode, the second processor 261 may analyze data input through the MAC unit 263, the USB device module 264 and so on, perform authentication with respect to data which should be processed under the control of the first CPU 210 as described above, convert the operation mode of the image forming apparatus 100' to a normal mode in response to an authenticated job request, and relay the received data to the first CPU 210.

The FIFO unit 262 or the second memory 140 stores data received through the network IF unit 111, the USB IF unit 112, the wake-up receiver 354, or the fax transmission/reception unit 355 temporarily.

The MAC unit 263 receives data received through the network IF unit 111 via the PHY chip 115 and performs a general Ethernet MAC function. The MAC unit 263 and the PHY chip 115 may be connected through Media Independent Interface (MII) for 100 Mbps transmission, Gigabit MII (GMII) for 1 Gbps transmission, or Reduced GMII (RGMII). Accordingly, the MAC 263 may support MII, GMII, or RGMII transmission.

In addition, the MAC 263 supports a Direct Memory Access (DMA) function and accordingly, may output data by MII, GMII or RGMII to the FIFO unit 262 or the second memory 140 under the control of the second CPU 260.

The USB device module 264 receives data that the USB IF unit 112 receives from an external apparatus. To do so, the USB device module 264 may include a USB PHY chip (not illustrated), a USB device (not illustrated), and a DMA (not illustrated). As the function of each component is already known in the related art, the detailed description thereof will not be provided. However, the data that the USB IF unit 112 receives is received through the USB PHY chip, and may be stored temporarily in the FIFO unit 262 or the second memory 140 through the USB device and the DMA.

Meanwhile, the first CPU 210 may change a mode of the first memory 130 which communicates with the first CPU 210 to a self-refresh mode, and request conversion of a mode to a power saving mode by notifying the second CPU 260 of a signal indicating the mode change. In this case, if the above signal is received, the second processor 261 enters into a power saving mode by outputting the above-described cutoff control signal to the power supply unit 180. Herein, the self-refresh means generating a refresh request signal and a control signal internally without requiring a control signal from an external device for low power consumption and executing a refresh operation by an address which is generated internally.

If the data received through the components 111, 112, 114 is set to be stored in the second memory 140 temporarily, the second memory controller 265 stores the received data in the second memory 140, and may read out the data stored in the second memory 140 and output the data through a data bus when relaying the data.

In addition, if the image forming apparatus 100' is turned on and booted, the second memory controller 265 may load and store the state information of the image forming apparatus 100', a system program required to operate a power saving mode, conditions for wake-up which are stored in a ROM (not illustrated) in the second memory 140.

The state information of the image forming apparatus 100' may be, for example, information regarding the state of an image forming apparatus 300 such as residual toner, development of job performance and so on. The second CPU 260 or the second processor 261 controls a part of operations of the image forming apparatus 100' in a normal mode and a power saving mode.

Hereinafter, operations of each of the first CPU 210 and the second CPU 260 will be explained for each operation mode based on the above configurations.

[Normal Mode]

The first CPU 210 controls an operation of the function unit 120 in a normal mode where power is supplied, and maintains a normal mode. In addition, the first CPU 210 may perform data communication with the network IF unit 111 and the USB IF unit 112 through the second CPU 260.

If the image forming apparatus 100' is turned on and booted, the first memory 130 loads one or more programs necessary to operate the image forming apparatus 100' and state information of the image forming apparatus 100' from a ROM (not illustrated) and stores the data. The first memory 130 which is a RAM may be a DDR memory. However, the present general inventive concept is not limited thereto.

As explained above, the second CPU 260 performs a basic communication operation, and if data to be processed in the first CPU 210 is received from an external apparatus, relays the received data to the first CPU 210.

[Conversion of a Mode from Normal Mode to Power Saving Mode]

The first CPU 210 may analyze whether there is an operation of the function unit 120 through the state analyzing unit 190, and if the image forming apparatus 100' does not operate for a predetermined time, determine that the mode should be changed to a power saving mode, and notify the determination to the second CPU 260.

If a request for a conversion of a mode to a power saving mode is received from the first CPU 210, the second CPU 260 which receives the request as a notification may cut off power to the first CPU 210 and the function unit 120 so that the first CPU 210 may enter into a power saving mode.

[Power Saving Mode]

If the image forming apparatus 300 enters into a power saving mode, the second CPU 260 maintains an operation with a minimum power supplied from the power supply unit 180.

If data is received through the components 111~114 after the image forming apparatus 300 enters into a power saving mode, the second processor 261 analyzes the received data and determines whether the received data satisfies one or more wake-up conditions or the received data may be processed therein.

In a power saving mode, if it is determined that the data received through the components 111~114 should be processed in the first CPU 210, the wake-up conditions are satisfied. The examples of the wake-up conditions include a fax ring signal, a selection signal of the wake-up receiver 354, a printing request signal, a cover open detection signal, a tray open detection signal, a mouse click signal, and so on.

Meanwhile, if a job performance command is received through the network IF 111 or the USB IF 112, the second CPU 260 may perform authentication of an external apparatus or a user which has transmitted the job performance command. Accordingly, the second CPU 260 may convert the mode to a normal mode with respect to an authenticated job performance command. Meanwhile, if authentication is not performed, the second CPU 260 may not convert the mode to a normal mode and abolish the input data. It is possible that the input data is immediately deleted according to the authentication result. It is also possible that the input data may be stored in the second memory for a predetermined period of time and may be deleted after the predetermined period of time. The input data may be used as a history to indicate a failure of authentication.

[Conversion Process from a Power Saving Mode to a Normal Mode]

If received data satisfies wake-up conditions, the second processor 261 determines that conversion of a mode to a normal mode is necessary and outputs a supply control signal to the power supply unit 180. The supply control signal is a signal to allow the power supply unit 180 to supply power to the function unit 120, the first CPU 210, and the first memory 130. Accordingly, the image forming apparatus 100' is converted from a power saving mode to a normal mode.

Hereinafter, the process of relaying the received data to the first CPU 210 will be explained in detail by describing transmission of the received data.

In a power saving mode, the data received through the network IF unit 111 (hereinafter, referred to as 'network data') is input to the MAC unit 263 via the network IF unit 111 and the PHY chip 115.

The second processor 261 stores the network data input to the MAC unit 263 in the FIFO unit 262 or in the second memory 140, analyzes the network data, and determines whether the network data satisfies one or more wake-up conditions. That is, the second processor 261 determines whether it is necessary to perform the conversion of a mode to a normal mode. If the network data is input from an authenticated apparatus, the second processor 261 determines that it is necessary to perform conversion of a mode to a normal mode, and controls the power supply unit 180 to supply power corresponding to the normal mode of the image forming apparatus 100'.

When the mode is converted to the normal mode, the second processor 261 may read out the network data stored in the FIFO unit 262 or in the second memory 140 and transmit the network data by being synchronized with the first CPU 210. Meanwhile, a data transmission path from the first CPU 210 to the network IF unit 111 is in a reverse order to the above-described process.

Hereinafter, a case in which the data received through the USB IF unit 112 (hereinafter, referred to as 'USB data') is relayed in a power saving mode will be explained. The USB data is input from an external apparatus which is connected to the USB IF unit 112 and stores in the FIFO unit 262 or in the second memory 140 under the control of the second processor 261.

The second processor 261 analyzes the USB data and determines whether conversion of a mode to a normal mode is required. If it is determined that the mode should be converted to a normal mode, that is, if the USB data is input from an authenticated apparatus, the second processor 261 controls the power supply unit 180 to provide each component of the image forming apparatus 100' with power corresponding to the normal mode. Once the mode is converted to the normal mode, the second processor 261 may read out the USB data stored in the FIFO unit 262 or the in the second memory 140 and transmit data corresponding to the USB data to the first CPU 210. Meanwhile, a data transmission path from the first CPU 210 to the USB IF unit 112 is in a reverse order to the above-described process.

Hereinafter, a case in which the data received through the wake-up receiver 113 (hereinafter, referred to as 'wake-up data') is relayed in a power saving mode will be explained. The wake-up data is a direct signal to request conversion of a mode to a normal mode, and thus the second processor 261 may store the wake-up data in the FIFO unit 262 or in the second memory 140 and control the power supply unit 180 to provide each component of the image forming apparatus 100' with power corresponding to the normal mode. Accordingly, the image forming apparatus 100' is converted to be in the normal mode. When the mode is converted to the normal mode, the second processor 261 may read out the stored wake-up data and transmit data corresponding to the wake-up data to the first CPU 210.

Hereinafter, a case in which the data received through the fax transmission/reception unit 114 (hereinafter, referred to as 'fax data') is relayed in a power saving mode will be explained. An external facsimile which is connected to the fax transmission/reception unit 114 in a way to enable communication with each other transmits the fax data to the fax transmission/reception unit 114. The fax data includes a ring data and actual data which is scanned and printed. The fax transmission/reception unit 114 provides the second CPU 260 with the transmitted ring signal.

The ring signal is a signal which satisfies wake-up conditions and thus, the second processor 261 may store the transmitted from the fax transmission/reception unit 114 in the FIFO unit 262 or in the second memory 140 and control the power supply unit 180 to provide each component of the image forming apparatus 100' with power corresponding to the normal mode.

If the operation mode of the image forming apparatus 100' is converted to a normal mode, the second processor 261 may read out the fax data stored in the FIFO unit 262 or in the second memory 140 and transmit data corresponding to the fax data to the first CPU 210. Meanwhile, the first CPU 210 may control the corresponding function unit 120 to scan and print the transmitted data.

Meanwhile, in the above description regarding FIGS. 1 to 5, the second CPU 210 operates even when the operation mode of the image forming apparatus 100 is a normal mode, but the second CPU 210 may not operate in a normal mode according to an exemplary embodiment. That is, the second CPU 260 and the second memory 140 may operate and the first CPU 210 and the first memory 130 may not operate in a power saving mode, and the first CPU 210 and the first memory 130 may operate and the second CPU 260 and the second memory 140 may operate in a normal mode.

Figure 6:
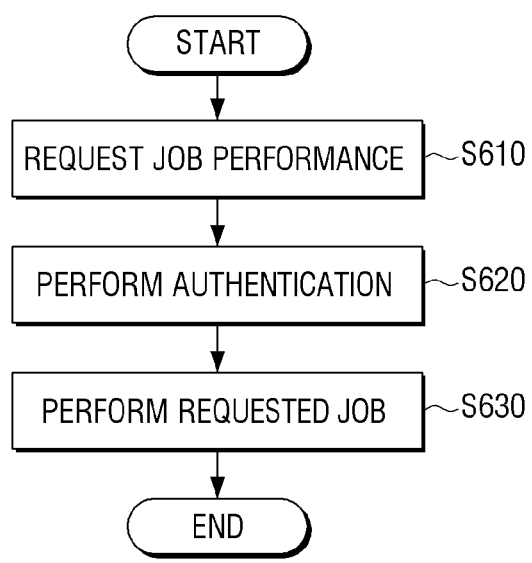
FIG. 6 is a flowchart illustrating a driving control method according to an exemplary embodiment of the present general inventive concept.

FIG. 6 is a flowchart illustrating a driving control method of an image forming apparatus according to an exemplary embodiment of the present general inventive concept.

Referring to FIG. 6, a job performance command is received from an external apparatus in a power saving mode at operation S610. The job performance command may be received from an external apparatus using a USB communication method or a network communication method in a power saving mode.

While the power saving mode is maintained, authentication of the external apparatus is performed at operation S620. If the job performance command is received from an external apparatus in a power saving mode, authentication may be performed before an operation state of the image forming apparatus 100 is converted. The detailed operation of the authentication will be explained later with reference to FIGS. 7 to 20. Such an authentication operation may be performed by a controller, and if the controller is realized as a plurality of CPUs, the authentication operation may be performed in the second CPU 260 which operates in a power saving mode.

If it is determined that the job performance command is from an unauthenticated external apparatus based on the authentication result, the operation mode of the image forming apparatus remains in the power saving mode. However, if it is determined that the job performance command is from an authenticated external apparatus, the operation mode of the image forming apparatus may be converted from the power saving mode to a normal mode and the requested job may be performed at operation S630.

As such, the driving control method according to the exemplary embodiment may prevent an unnecessary wake-up operation for a job request when the job request is input from an unauthenticated user or an unauthenticated apparatus, thereby preventing unnecessary power consumption. The driving control method illustrated in FIG. 6 may be performed in an image forming apparatus having the configuration of FIG. 5, and may also be performed in an image forming apparatus having other configurations.

In addition, the driving control method according to the exemplary embodiment may be realized as a program including an algorithm executable in a computer, and the program may be stored and provided in a computer readable medium.

Herein, the computer readable medium refers to a medium which may store data semi-permanently rather than storing data for a short time such as a register, a cache, and a memory and may be readable by an apparatus. The above-mentioned various applications or programs may be stored in a non-temporal recordable medium such as CD, DVD, hard disk, Blu-ray disk, USB, memory card, and ROM and provided therein.

Hereinafter, various authentication processing methods according to an exemplary embodiment will be explained with reference to FIGS. 7 to 15. In the following description, it is assumed that the operation mode of the image forming apparatus 100 at the initial stage of an operation is a power saving mode.

Figure 7:
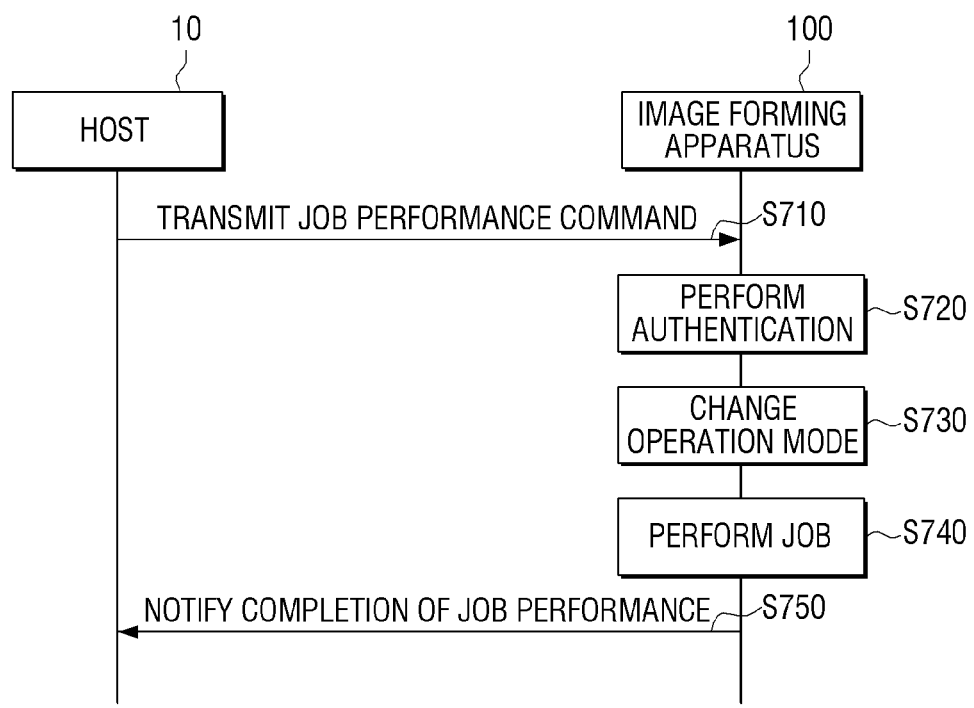
FIG. 7 is a sequence view illustrating an authentication processing method according to an exemplary embodiment of the present general inventive concept.

FIG. 7 is a sequence view illustrating an authentication processing method according to an exemplary embodiment of the present general inventive concept. The authentication processing method according to the exemplary embodiment relates to a method of performing authentication in the image forming apparatus 100 therein using the address information of a host apparatus 10.

Referring to FIG. 7, the host apparatus 10 (a printing control terminal apparatus or an external apparatus) transmits a job performance command to the image forming apparatus at operation S710. Meanwhile, in the exemplary embodiment, the host apparatus 10 transmits only a job performance command. However, the present general inventive concept is not limited thereto. It is possible that printing data may be transmitted along with the job performance command.

Meanwhile, the printing data may be transmitted after authentication is performed. Alternatively, the printing data may be transmitted directly from the host apparatus 10 to the image forming apparatus 100 without a job performance command. In this case, the transmission of the printing data may be regarded as a job performance command.

The image forming apparatus 100 which receives the job performance command may perform authentication at operation S720. The image forming apparatus 100 may determine whether there is address information of the host apparatus 10 which has transmitted the job performance command in pre-stored apparatus information by comparing the address information of the host apparatus 10 (for example, IP address and/or MAC address) with the pre-stored apparatus information.

For example, if there is the IP address of the host apparatus 10 which has transmitted the job performance command in a plurality of pre-stored IP addresses, the image forming apparatus 100 may determine that the job performance command is input from an authenticated apparatus corresponding to the pre-stored IP address. The address information of the host apparatus 10 may be extracted from a MAC layer of the OSI. Accordingly, only a job performance request from predetermined address information may be transmitted to a processor in the MAC layer, and a job performance request from an external apparatus rather than the pre-stored address information may be cut off in the MAC layer.

If it is determined that a job performance command is received from an authenticated external apparatus based on the authentication result, the operation mode of the image forming apparatus is converted from a power saving mode to a normal mode at operation S740. Since the conversion of the operation mode has been explained in detailed in the above description, further description will not be provided.

If the operation mode is converted to a normal mode, the image forming apparatus 100 performs a function corresponding to the requested job performance command at operation S740. Once the job is completed, the image forming apparatus 100 may notify the host apparatus 10 which requested the job performance command that the requested job has been completed. Meanwhile, if a job performance command is a scanning performance command, scanning data may be transmitted to the host apparatus 10 in the above operation.

As such, the authentication processing method according to the exemplary embodiment performs authentication using an IP address or a MAC address. Since data of the IP address or MAC address has a relatively small amount of data, this data can be stored in the second memory 140. Further, the data is applicable only through a simple modification in the MAC layer stage.

Meanwhile, in the above exemplary embodiment, the operation mode of the image forming apparatus 100 is converted only by performing the authentication of an external apparatus without analyzing the characteristics of the job requested by a user, but if the job requested from an external apparatus is a reserved job, the image forming apparatus 100 may store the received job while maintaining a power saving mode without converting the operation mode immediately with respect to the job request from an authenticated external apparatus. And when a reservation time to perform the reserved job comes or a period of time elapses, the operation mode of the image forming apparatus is converted to a normal mode, and the reserved job may be performed.

In the above description, the operation of the image forming apparatus 100 has been explained based on the premise that authentication is successful. Hereinafter, the operation of the image forming apparatus 100 when authentication is failed will be explained with reference to FIGS. 8 to 10.

Figure 8:
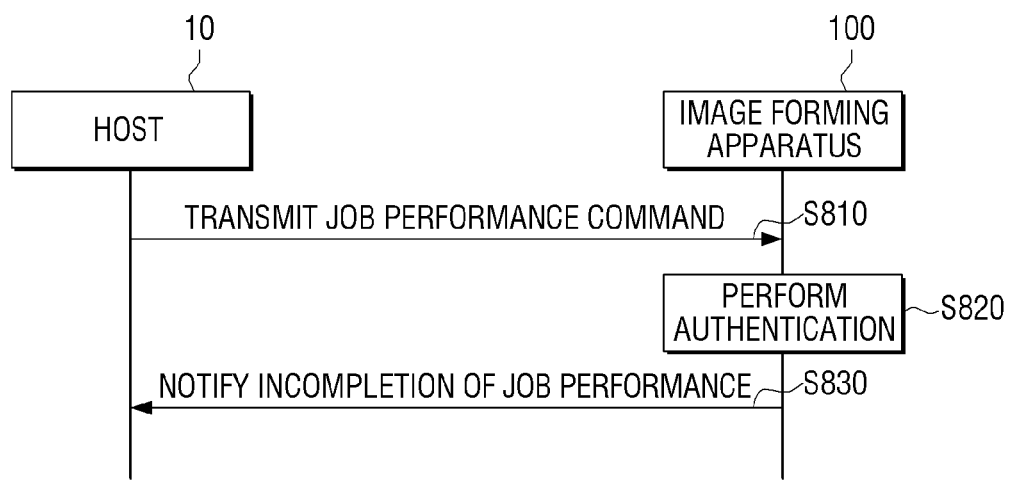
FIG. 8 is a sequence view illustrating a driving control method when authentication is failed according to an exemplary embodiment of the present general inventive concept.
Figure 10:
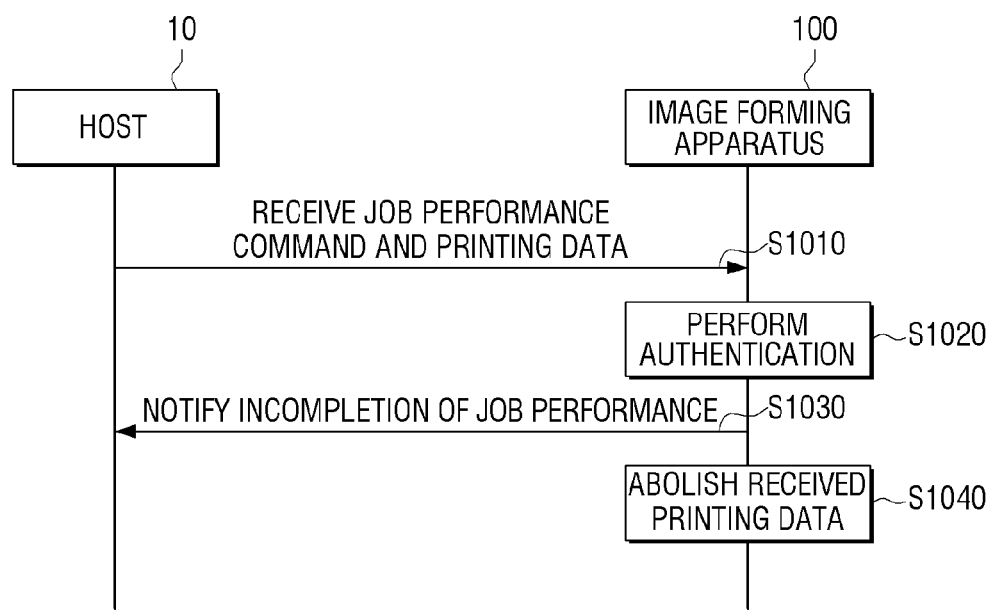
FIG. 10 is a sequence view illustrating a driving control method when authentication is failed according to an exemplary embodiment of the present general inventive concept.

FIGS. 8 to 10 are sequence views illustrating a driving control method when authentication is failed according to an exemplary embodiment of the present general inventive concept.

Referring to FIG. 8, the host apparatus 10 (printing control apparatus or an external apparatus) transmits a job performance command to the image forming apparatus 100 at operation S810 or S1010.

Subsequently, the image forming apparatus 100 which receives the job performance command may perform authentication at operation S820 or S1020. In this case, if the IP address and/or MAC address of the host apparatus 10 which has transmitted the job performance command is not pre-registered in the image forming apparatus 100 or authentication is failed in the process which will be explained later with reference to FIGS. 11 to 20, the image forming apparatus 100 may not convert the operation mode and maintain the current power saving mode.

The image forming apparatus 100 may notify the host apparatus 10 that authentication has not been succeeded at operation S830 or S1030, and at this time, the host apparatus 10 may display a user interface window 900 as illustrated in FIG. 9.

The user interface window 900 may be a user interface window which is provided by a printer driver of the host apparatus 10 or a user interface window that the image forming apparatus 100 provides to the host apparatus 10. It is possible that the image forming apparatus 100 outputs a signal indicating the authentication failure and then the host apparatus 10 generates a user interface window of FIG. 9 according to the received signal.

Meanwhile, in the above description, the host apparatus 10 transmits only a job performance command to the image forming apparatus 100, but printing data may be transmitted as a job performance command or printing data may be transmitted along with a job performance command as described above.

Meanwhile, if the received printing data is stored in a buffer (FIFO) or in the second memory 140, the image forming apparatus 100 may abolish (that is, delete) the printing data transmitted from an authenticated host apparatus 10 in order to provide a space to receive other data. Meanwhile, according to an exemplary embodiment, printing data may not be deleted immediately but after a predetermined time elapses or other printing data is received (that is, at the time when storage capacity is running out).

Figure 11:
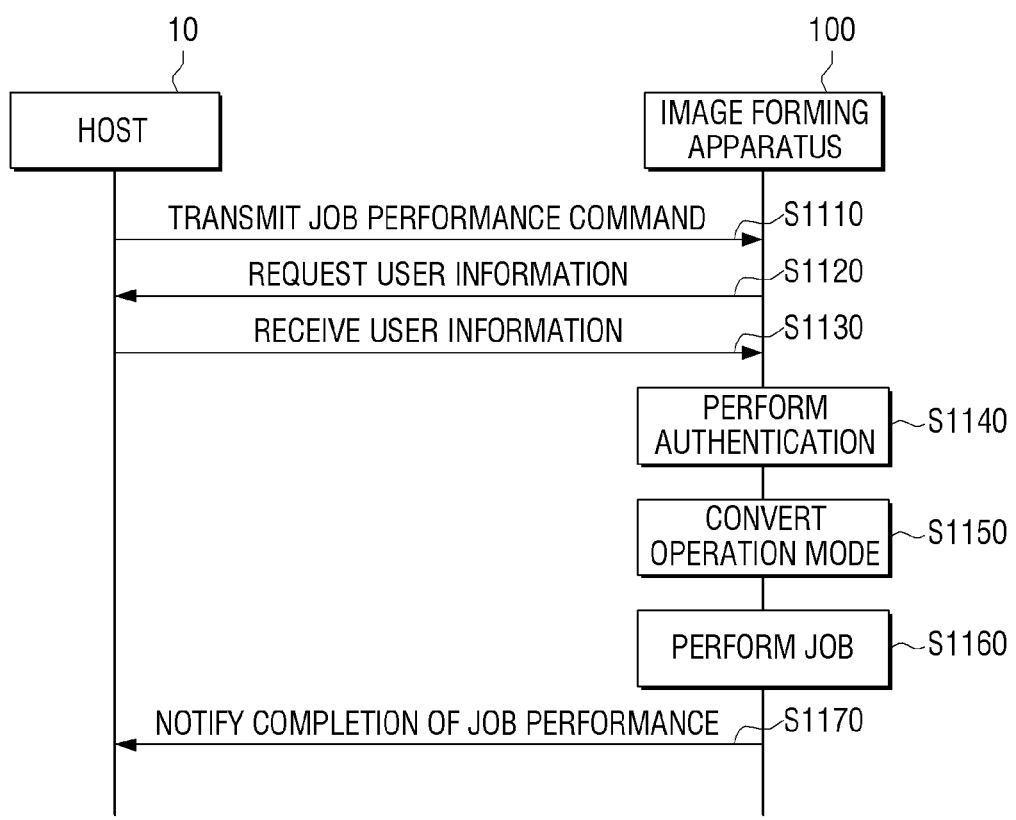
FIG. 11 is a sequence view illustrating an authentication processing method according to an exemplary embodiment of the present general inventive concept.

FIG. 11 is a sequence view illustrating an authentication processing method according to an exemplary embodiment of the present general inventive concept. The authentication processing method according to the exemplary embodiment relates to performing authentication in the image forming apparatus 100 therein using information of a user who has requested job performance.

Referring to FIG. 11, the host apparatus 10 transmits a job performance command to the image forming apparatus 100 at operation S1010.

Subsequently, the image forming apparatus 100 which receives the job performance command requests the host apparatus 10 which has transmitted the job performance command to transmit user information in order to perform user authentication at operation S1120.

Figure 12:
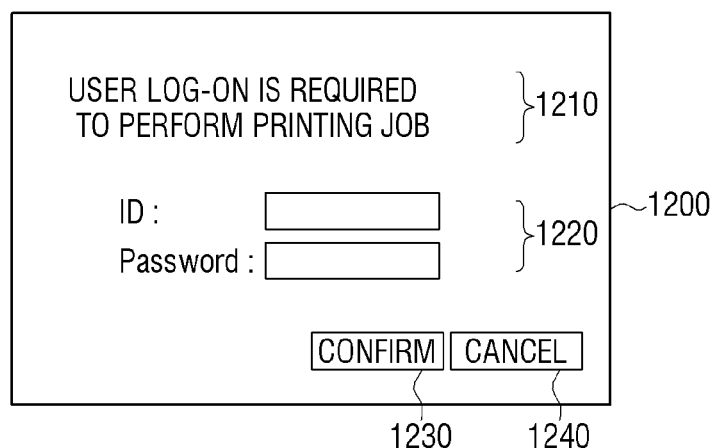
FIG. 12 is a view illustrating an example of a user interface window which can be displayed on a host apparatus.

The host apparatus 10 which receives a request for user information may display a user interface window as illustrated in FIG. 12 and receive user information from a user (for example, user identification (ID) and password). The user interface window may be provided by a printer driver of the host apparatus 10, and if the host apparatus 10 is an apparatus such as a smart phone, the image forming apparatus 100 may transmit the user interface window in the process of requesting user authentication.

The host apparatus 10 which receives the user information from a user transmits the user information to the image forming apparatus 100 at operation S1130.

The image forming apparatus 100 which has received the job performance command may perform authentication at operation S1140. The image forming apparatus 100 may determine whether there is the user information received from the host apparatus 10 which has transmitted the job performance command in pre-stored user information by comparing the user information received from the host apparatus 10 (for example, ID and password) with the pre-stored user information. For example, if the received user ID and password are consistent with or identical to the pre-stored user ID and password, the job performance command is determined to be a command from an authenticated apparatus. Meanwhile, in the above exemplary embodiment, only ID and password are mentioned as an example of user information, but the present general inventive concept is not limited thereto. It is possible that the user information may be a key value of a specific one item, employee number, or a mobile phone number which may identify a user.

If it is determined that the job performance command is received from an authenticated apparatus based on the authentication result, the operation mode of the image forming apparatus is converted from a power saving mode to a normal mode at operation S1150. Since the conversion of the operation mode has been explained in detail in the above exemplary embodiment further description will not be provided.

If the operation mode is converted to a normal mode, the image forming apparatus 100 performs a function corresponding to the requested job performance command at operation S1160. When the job is completed, the image forming apparatus 100 may notify the host apparatus 10 which requested the job performance command that the job has been completed at operation S1170. Meanwhile, if the job performance command is a scanning command, the image forming apparatus 100 may perform a scanning operation to generate scanning data, and then the scanning data may be transmitted to the host apparatus 10 at this stage.

As described above, the authentication processing method according to the exemplary embodiment performs authentication using simple user information which is pre-stored, and thus the amount of data which should be stored in the second memory 140 is not so great.

Meanwhile, in the above exemplary embodiment, user information is transmitted in response to a user information request of the image forming apparatus 100, but the user information may be transmitted along with a job performance command, which will be explained later with reference to FIG. 13.

FIG. 12 is a view illustrating a user interface window 1200 which can be displayed on the host apparatus 10.

Referring to FIG. 12, the user interface window 1200 includes a first area 1210 to inform a user that log-on is required, a second area 1220 to receive user information, a confirmation area 1230, and a cancellation area 1240.

The first area 1210 is an area to provide an alarm message to inform a user that user authentication is necessary to perform a requested job performance command.

The second area 1220 is an area to receive the user information. In the exemplary embodiment, ID and password are received as the user information, but other types of information may be received as the user information.

The confirmation area 1230 is an area to process with the subsequent operation after the user information is input. If a user inputs the user information and selects the confirmation area 1230, the host apparatus 10 transmits the input user information to the image forming apparatus 100.

The cancellation area 1240 is an area to receive a command to cancel a requested job performance command.

Figure 13:
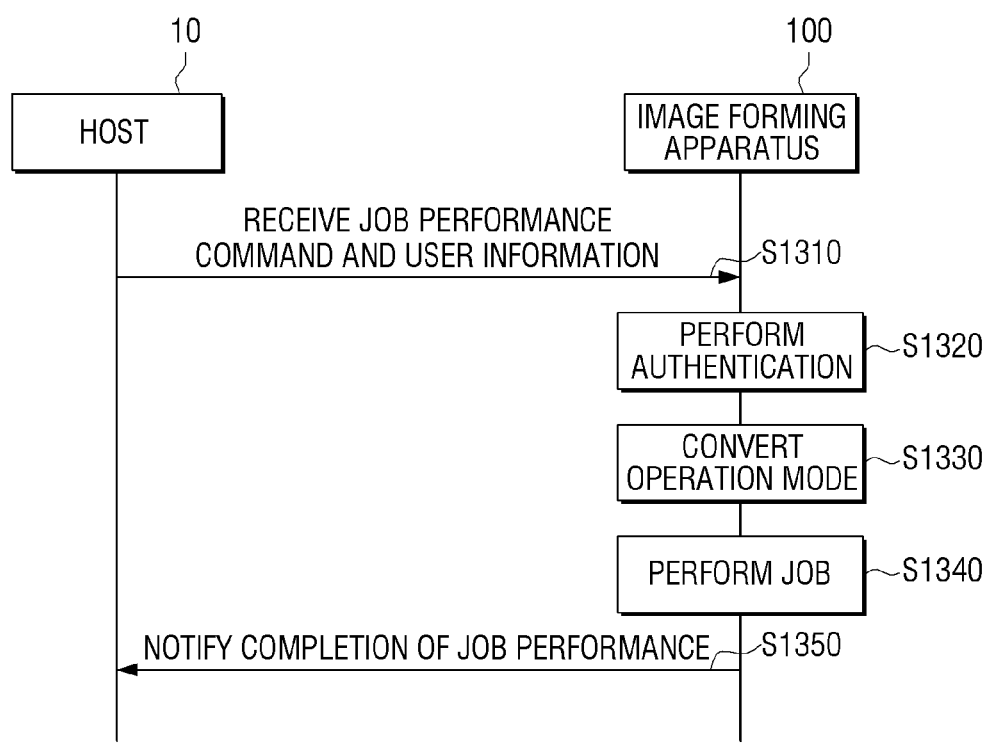
FIG. 13 is a sequence view illustrating an authentication processing method according to an exemplary embodiment of the present general inventive concept.

FIG. 13 is a sequence view illustrating an authentication processing method according to an exemplary embodiment of the present general inventive concept. The authentication processing method according to the exemplary embodiment relates to an operation of simultaneously receiving user information and a job performance command and performing authentication in the image forming apparatus 100 therein using the received user information.

Referring to FIG. 13, the host apparatus 10 transmits the job performance command and user information to the image forming apparatus 100 at operation S1310. The host apparatus 10 may receive user information from a user before receiving a printing command. Such an operation may be a log-on operation in the process of booting of the host apparatus 10, a log-on operation for network connection, or an input operation of inputting the printing command.

If a job performance command (for example, a printing command) is received from a user, the host apparatus 10 may transmit the job performance command along with user information to the image forming apparatus 100. Meanwhile, in the above exemplary embodiment, the host apparatus 10 transmits only a job performance command, but data such as printing data may be transmitted together with the job performance command.

The image forming apparatus 100 which receives the user information performs authentication based on the received user information at operation S1320. The specific operation of performing authentication has been explained above in the operation of S1140 of FIG. 11, and thus further description will not be provided.

If a job performance command from an external apparatus is an authenticated job performance command, the operation mode of the image forming apparatus is converted from a power saving mode to a normal mode at operation S1330, and the image forming apparatus 100 performs a function corresponding to the requested job performance command at operation S1340. When the job is completed, the image forming apparatus 100 may notify the host apparatus 10 which has requested the job performance command that the job has been completed at operation S1350.

As such, the authentication processing method according to the exemplary embodiment may perform authentication using the user information, and thus an amount or size of data corresponding to the user information may be not larger to be stored in a small memory space of the second memory 140. In addition, the user information is provided to an image forming apparatus along with a printing command, and thus authentication may be performed in more rapid manner.

Meanwhile, in the above exemplary embodiment, the image forming apparatus 100 stores specific information and performs authentication therein, but authentication may be performed using an external management server, which will be explained below with reference to FIGS. 14 and 15.

Figure 14:
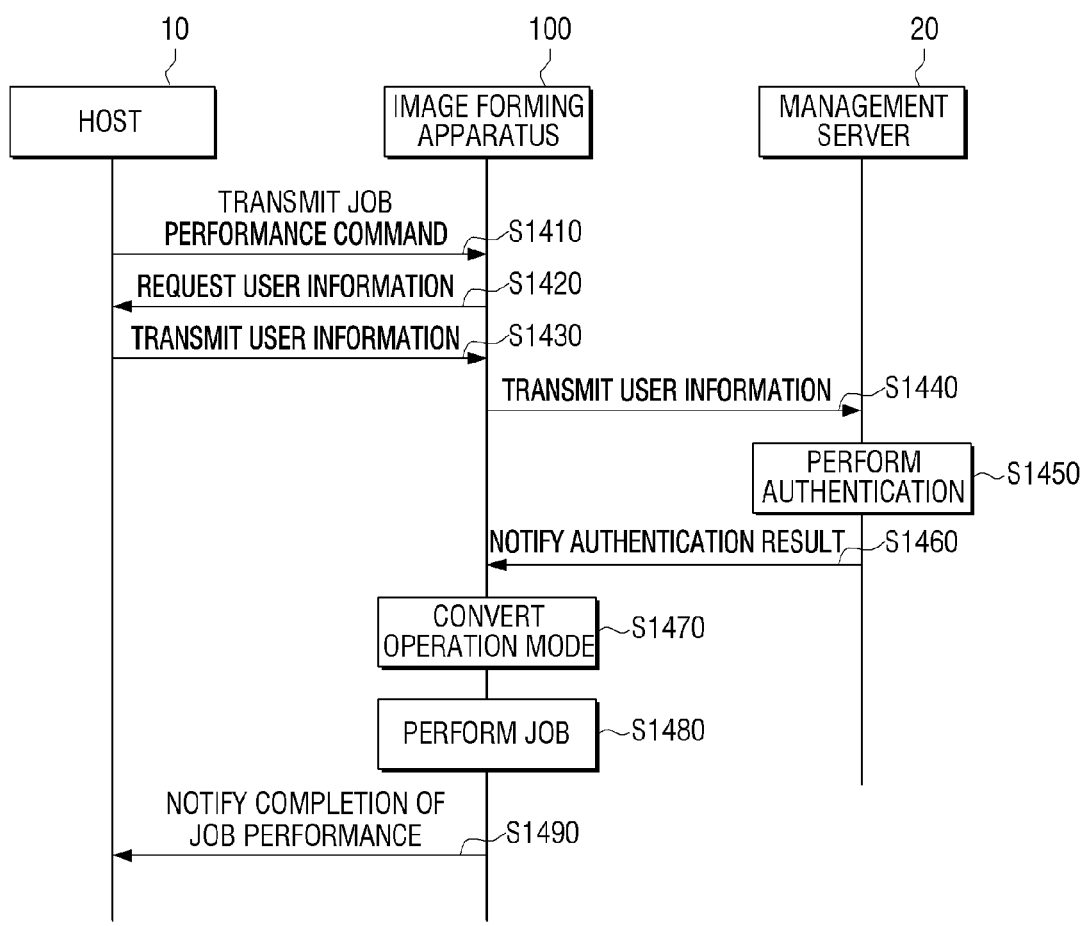
FIG. 14 is a sequence view illustrating an authentication processing method according to an exemplary embodiment of the present general inventive concept.

FIG. 14 is a sequence view illustrating an authentication processing method according to an exemplary embodiment of the present general inventive concept. The authentication processing method according to the exemplary embodiment relates to an operation of receiving user information from a host apparatus and performing authentication using an external management sever and the user information.

Referring to FIG. 14, the host apparatus 10 transmits a job performance command to the image forming apparatus 100 at operation S1410.

Subsequently, the image forming apparatus 100 which receives the job performance command requests the host apparatus 10 which transmitted the job performance command to transmit user information in order to perform user authentication at operation S1420. The operations of requesting user information and receiving the user information from a user have been explained above with reference to FIGS. 11 and 12, and thus further description will not be provided.

The host apparatus 10 which receives the user information from a user transmits the user information to the image forming apparatus 100 at operation S1430.

The image forming apparatus 100 which receives the user information transmits the user information to the management server 20 at operation S1440. The image forming apparatus 100 may transmit the user information received from the host apparatus 10 to the management server 20 in order to perform authentication of the image forming apparatus 100.

The management server 20 which receives the user information may perform authentication at operation S1450. The management server 20 may determine whether there is the user information received from the host apparatus 10 which has transmitted the job performance command in pre-stored user account information by comparing the user information received from the host apparatus 10 (for example, ID and password) with the pre-stored user account information. In the exemplary embodiment, authentication is performed using a user ID and etc., but various authentication processing algorithms other than the user ID may be used to perform authentication.

The management server 20 notifies the authentication processing result to the image forming apparatus 100 at operation S1460, and if it is determined that the job performance command is from an authenticated external apparatus based on the authentication processing result, the image forming apparatus 100 changes a current mode to a different mode, for example, converts the operation mode of the image forming apparatus from a power saving mode to a normal mode at operation S1470.

If the operation mode is converted to a normal mode, the image forming apparatus 100 performs a function corresponding to the requested job performance command at operation S1480. When the job is completed, the image forming apparatus 100 may notify the host apparatus 10 that the requested job performance has been completed at operation S1490.

As such, the authentication processing method according to the fourth exemplary embodiment performs authentication using a management server capable of storing a large amount of information, and thus it is possible to perform authentication of various users.

Meanwhile, in the exemplary embodiment, only user information is transmitted to the management server 20, but a job performance command may be transmitted to the management server 20 along with user information. Accordingly, the management server 20 may not only perform user authentication but also determine whether a user has authority for a requested job of the job performance command. For example, if a user A has an authority only for a printing job and has no authority for a fax job, and a user A transmits a job performance command regarding a fax job, authentication for the corresponding job may not be performed even if the job is requested from the authenticated user. In addition, if a user B has an authority for printing of 100 pages for one month and has already printed 100 pages during a period of a month, a subsequent printing command may not be authenticated.

Meanwhile, in the above exemplary embodiment, the user information is transmitted in response to a user information request of the image forming apparatus 100, but the user information may be transmitted along with a job performance command, which will be explained below with reference to FIG. 15.

Figure 15:
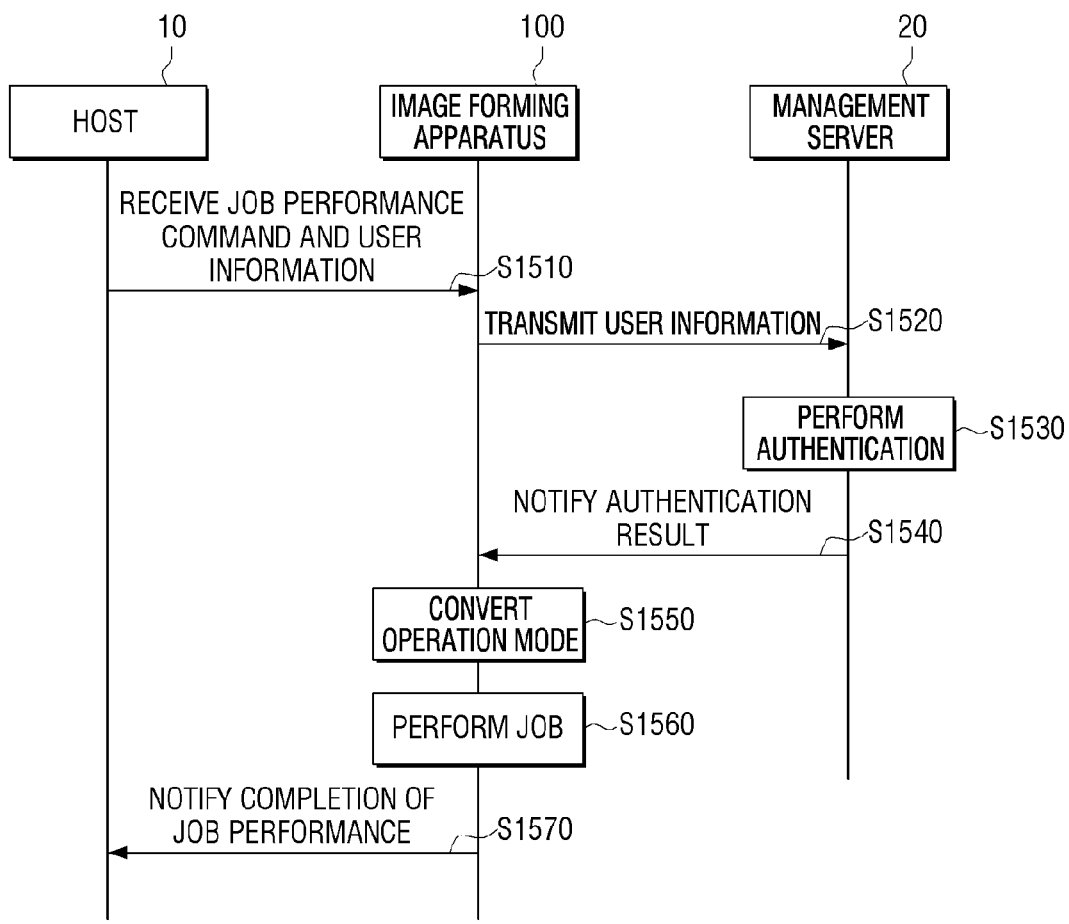
FIG. 15 is a sequence view illustrating an authentication processing method according to an exemplary embodiment of the present general inventive concept.

FIG. 15 is a sequence view illustrating an authentication processing method according to an exemplary embodiment of the present general inventive concept. The authentication processing method according to the exemplary embodiment relates to an operation of receiving user information in an operation of requesting job performance and performing authentication using an external management server and the user information.

Referring to FIG. 15, the host apparatus 10 transmits a job performance command and user information to the image forming apparatus 100 at operation S1510. The host apparatus 10 may receive the user information from a user before receiving a printing command (or the job performance command). Such an operation may be a log-on operation in the process of booting of the host apparatus 10, a log-on operation for network connection or an operation of inputting the printing command (or the job performance command).

If a job performance command (for example, a printing command) is received from a user, the host apparatus 10 may transmit the job performance command along with the user information to the image forming apparatus 100. Meanwhile, in the above exemplary embodiment, the host apparatus 10 transmits only a job performance command, but data, such as printing data, may be transmitted together with the job performance command.

The image forming apparatus 100 transmits the received user information to the management server 20 at operation S1520. The image forming apparatus 100 may transmit the user information received from the host apparatus 10 to the management server 20 in order to perform authentication. In this case, the image forming apparatus 100 may transmit the requested job performance command along with the user information.

The management server 20 which receives the user information may perform authentication at operation S1530. The specific operation of performing authentication is the same as the operation S1450 of FIG. 14, and thus further description will not be provided.

The management server 20 notifies the image forming apparatus 100 of the authentication processing result at operation S1540, and if it is determined that the job performance command is from an authenticated external apparatus based on the authentication processing result, the image forming apparatus 100 converts the operation mode of the image forming apparatus from a power saving mode to a normal mode at operation S1550.

If the operation mode is converted to a normal mode, the image forming apparatus 100 performs a function corresponding to the requested job performance command at operation S1560. When the job is completed, the image forming apparatus 100 may notify the host apparatus 10 that the requested job performance has been completed at operation S1570.

As such, the authentication processing method according to the exemplary embodiment performs authentication using a management server capable of storing a large amount of information, and thus it is possible to perform authentication of various users. In addition, the printing control terminal apparatus 10 transmits user information along with a job performance request, and thus authentication may be performed in more rapid manner.

Meanwhile, in the exemplary embodiment, only user information is transmitted to the management server 20, but a job performance command may be transmitted to the management server 20 along with user information.

Meanwhile, in the above exemplary embodiment, only one authentication processing method has been explained, but the above-described authentication processing operation may include a plurality of combinations thereof. That is, if authentication is not performed through one authentication processing and requires additional authentication processing, final authentication can be performed when a plurality of authentication processing is completed, which will be explained later with reference to FIG. 16.

Figure 16:
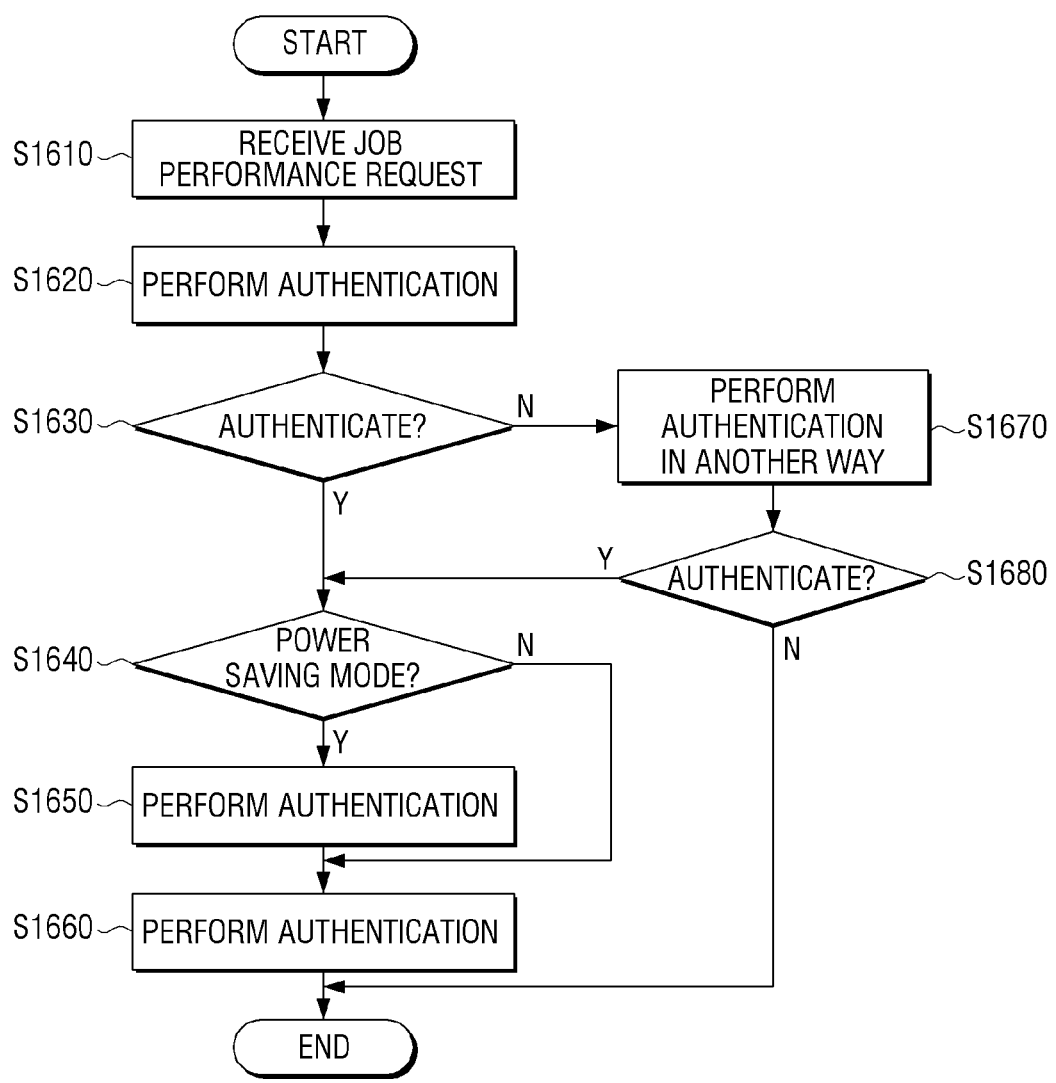
FIG. 16 is a flowchart illustrating a driving control method according to an exemplary embodiment of the present general inventive concept.

FIG. 16 is a flowchart illustrating a driving control method according to an exemplary embodiment of the present general inventive concept.

Referring to FIG. 16, a job performance command is received from an external apparatus at operation S1610. The job performance command may be received from an external apparatus according to a USB communication method or a network communication method.

Subsequently, authentication of the external apparatus is performed in an image forming apparatus therein while a current operation state is maintained at operation S1620. The authentication may be performed by comparing address information and/or user information of the external apparatus with address information and/or user information pre-stored in the image forming apparatus 100 therein.

Based on the authentication result, if it is determined that the job performance command is from an authenticated external apparatus at operation S1630-Y, the current operation state of the image forming apparatus 100 is determined at operation S1640.

If the current operation state of the image forming apparatus is a power saving mode at operation S1640-Y, the operation mode of the image forming apparatus is converted from a power saving mode to a normal mode at operation S1650, and a job corresponding to the requested job performance command may be performed at operation S1660. Meanwhile, if the current operation state of the image forming apparatus is a normal mode at operation S1640-N, a job corresponding to the requested job performance command may be performed without conversion of the operation mode.

Meanwhile, based on the authentication result, if it is determined that the job performance command is received from an unauthenticated external apparatus, the image forming apparatus 100 may maintain the current operation mode which is a power saving mode and perform another or a new authentication differently from the previously performed authentication operation S1670. If the previous authentication is performed using the address information of the external apparatus, the next authentication may be performed using user information. Alternatively, if the previous authentication is performed using the user information and address information pre-stored in the image forming apparatus 100, the next authentication may be performed using the management server 20, which will be explained later, respectively, with reference to FIGS. 17 to 20.

Based on the second authentication result, if it is determined that the job performance command is received from an unauthenticated external apparatus, the requested job performance command is not performed at operation S1680-N. If the operation mode of the image forming apparatus 100 is a power saving mode, conversion of the operation mode is not performed.

However, based on the authentication result, if the job performance command is from an authenticated external apparatus at operation S1680-Y, the operation mode of the image forming apparatus is converted from a power saving mode to a normal mode according to the operation mode of the image forming apparatus at operation S1650, and the requested job may be performed at operation S1660.

As such, the driving control method according to the exemplary embodiment performs authentication first to determine whether wake-up is necessary to perform the authentication, and thus, an unnecessary wake-up operation may be prevented regarding an operation request from an unauthenticated user or an authenticated apparatus, preventing unnecessary power consumption of the system as well. Further, it is possible that while the previous authentication is not performed, the second authentication may be performed in another way. Accordingly, even if a user requests a job using another apparatus, the requested job may be performed. Such a driving control method may be performed in an image forming apparatus having configuration of FIGS. 2 to 4, but may also be performed in an image forming apparatus having other configurations.

In addition, the driving control method according to the exemplary embodiment may be realized as a program including an algorithm executable in a computer, and the program may be stored in a non-transitory computer readable medium and provided therein.

Figure 17:
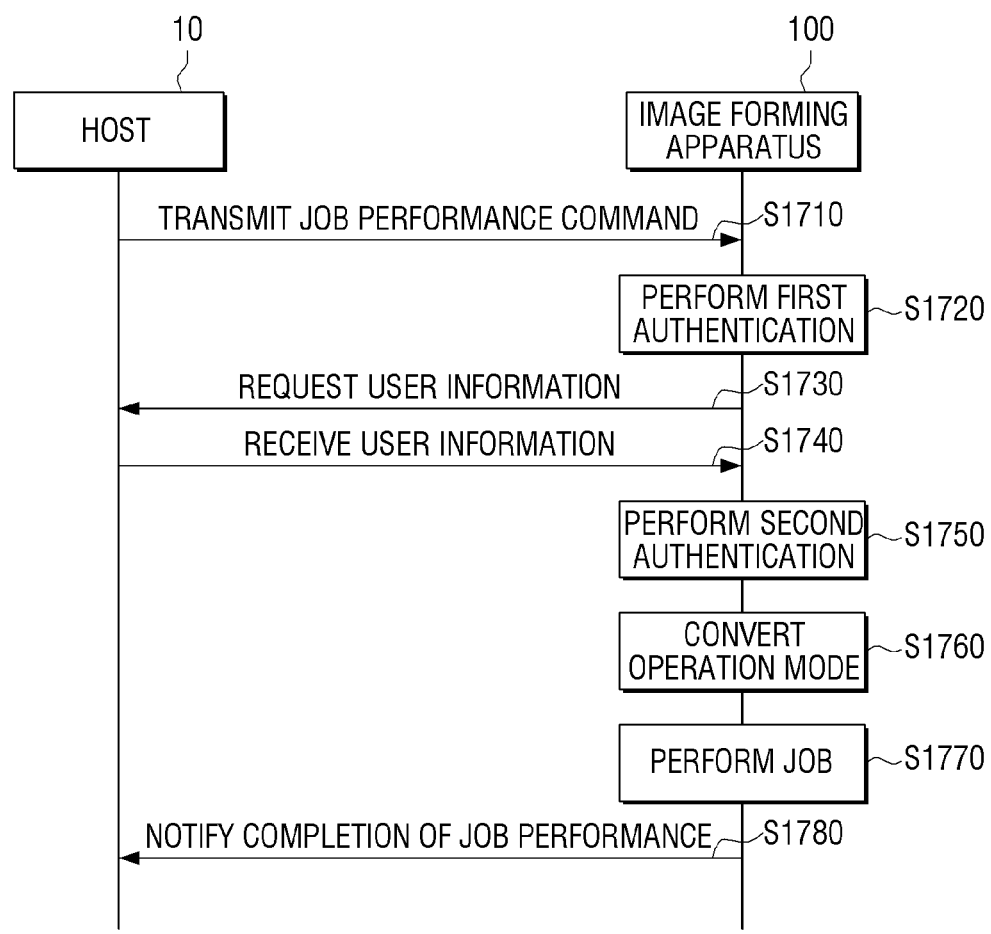
FIG. 17 is a sequence view illustrating an authentication processing method according to an exemplary embodiment of the present general inventive concept.

FIG. 17 is a sequence view illustrating an authentication processing method according to an exemplary embodiment of the present general inventive concept. The authentication processing method according to the exemplary embodiment performs a first authentication using address information and performs a second authentication using user information.

Referring to FIG. 17, the host apparatus 10 transmits a job performance command to the image forming apparatus 100 at operation S1710.

Subsequently, the image forming apparatus 100 which received the job performance command may perform authentication at operation 1720. In this case, an authentication may be performed according to whether the IP address and/or MAC address of the host apparatus 10 which has transmitted the job performance command is pre-registered in the image forming apparatus 100. In this case, if the authentication is succeeded, conversion of an operation mode may be performed immediately.

On the other hand, if the authentication using address information is not succeeded, the image forming apparatus 100 requests the host apparatus 10 which has transmitted the job performance command to transmit the user information in order to perform user authentication at operation S1730.

Figure 18:
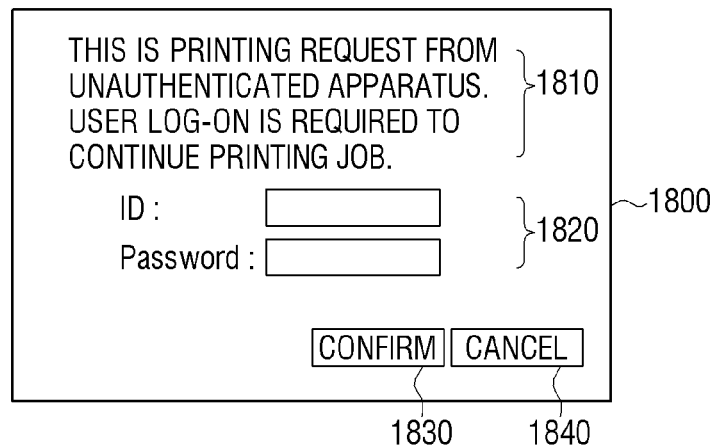
FIG. 18 is a view illustrating an example of a user interface window which can be displayed on a host apparatus.

The host apparatus 10 which receives the request for user information may display a user interface window as illustrated in FIG. 18 and receive user information (for example, ID and password) from a user. Such a user interface window may be provided by a printer driver of the host apparatus 10, and if the host apparatus 10 is an apparatus such as a smart phone, the image forming apparatus 100 may transmit the user interface window in the process of requesting user authentication.

The host apparatus 10 which receives user information from a user transmits the user information to the image forming apparatus 100 at operation S1740.

The image forming apparatus 100 which receives the job performance command may perform the second authentication at operation S1750. The image forming apparatus 100 may determine whether there is the user information received from the host apparatus 10 which has transmitted the job performance command in the pre-stored user information.

Based on the second authentication result, if it is determined that the job performance command is received from an authenticated external apparatus, the operation mode of the image forming apparatus is converted from a power saving mode to a normal mode at operation S1760. Since the conversion of operation mode is already explained above in detail, further description will not be provided.

Once the operation mode is converted to a normal mode, the image forming apparatus 100 performs a function corresponding to the requested job performance command at operation S1770. When the job is completed, the image forming apparatus 100 may notify the host apparatus 10 which requested the job performance command that the job has been completed at operation S1780.

As described above, the authentication processing method according to the exemplary embodiment performs the first authentication using IP address or MAC address which has a relatively small amount of data, and thus the data can be stored in a small memory space of the second memory 140. In addition, if the first authentication is failed, the second authentication may be performed using another method, and thus even if a user requests a job using another apparatus, the requested job may be performed. In addition, the second authentication may also be performed in the image forming apparatus 100 therein, and thus authentication may be performed in rapid manner.

Meanwhile, in the above exemplary embodiment, user information is requested and received in a case the first authentication is failed. However, if the first authentication is failed, the job performance command may be disregarded, and if the authentication is succeeded, the user information may be received in order to perform double authentication, depending on exemplary embodiments.

In the above exemplary embodiment, user information is transmitted in response to a user information request of the image forming apparatus 100, but user information may be transmitted along with a job performance command.

In addition, in the above exemplary embodiment, authentication is performed using only the address information and user information stored in the image forming apparatus 100, but authentication may be performed using information stored in the image forming apparatus first, and then using information stored in a management server, which will be explained later with reference to FIGS. 19 and 20.

FIG. 18 is a view illustrating a user interface window 1800 which can be displayed on the printing control terminal apparatus (or host apparatus) 10.

Referring to FIG. 18, the user interface window 1800 includes a first area 1810 to inform a user that log-on is required, a second area 1820 to receive user information, a confirmation area 1830, and a cancellation area 1840.

The first area 1810 is an area to provide an alarm message informing that user authentication is necessary since an apparatus which currently requests a job is not an authenticated apparatus.

The second area 1820 is an area to receive the user information. In the exemplary embodiment, ID and password are received as the user information, but other types of information may be received as the user information.

The confirmation area 1830 is an area to proceed with the subsequent operations after the user information is input. If a user inputs the user information and selects the confirmation area 1830, the printing control terminal apparatus 10 transmits the input user information to the image forming apparatus 100.

The cancellation area 1840 is an area to receive a command to cancel a requested job performance command.

Figure 19:
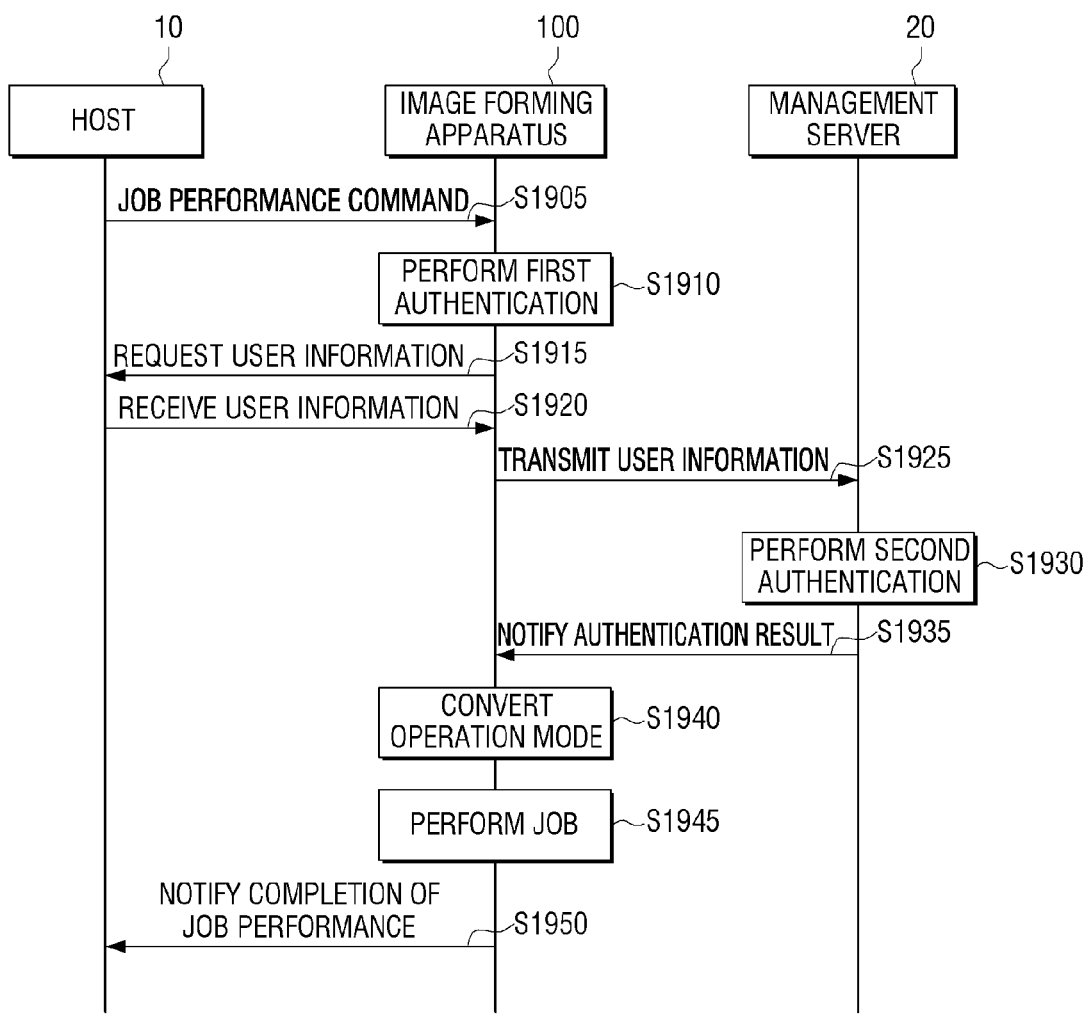
FIG. 19 is a sequence view illustrating an authentication processing method according to an exemplary embodiment of the present general inventive concept.

FIG. 19 is a sequence view illustrating an authentication processing method according to an exemplary embodiment of the present general inventive concept. The authentication processing method according to the exemplary embodiment relates to an operation of performing a first authentication using address information and performing a second authentication using an external management server and user information.

Referring to FIG. 19, the host apparatus 10 transmits a job performance command to the image forming apparatus 100 at operation S1905.

Subsequently, the image forming apparatus 100 which received the job performance command may perform authentication at operation S1910. In this case, the first authentication may be performed according to whether the IP address and/or MAC address of the host apparatus 10 which has transmitted the job performance command is pre-registered in the image forming apparatus 100. In this case, if the first authentication is succeeded, conversion of an operation mode may be performed immediately.

On the other hand, if the first authentication using the address information is not succeeded, the image forming apparatus 100 requests the host apparatus 10 which has transmitted the job performance command to transmit the user information in order to perform user authentication at operation S1915.

The host apparatus 10 which receives the request for the user information may display a user interface window as illustrated in FIG. 18 and receive the user information (for example, ID and password) from a user. The host apparatus 10 which receives the user information transmits the user information to the image forming apparatus at operation S1920.

The image forming apparatus 100 transmits the received user information to the management server 20 at operation S1925. The image forming apparatus 100 may transmit the user information received from the host apparatus 10 to the management server in order to perform the second authentication.

The management server 20 which receives the user information may perform the second authentication at operation S1930. The management server 20 may determine whether there is the user information received from the host apparatus 10 which has transmitted the job performance command in pre-stored user account information by comparing the user information received from the host apparatus 10 (for example, ID and password) with the pre-stored user account information.

The management server 20 notifies the authentication processing result to the image forming apparatus 100 at operation S1935, and if it is determined that the job performance command is from an authenticated external apparatus based on the authentication processing result, the image forming apparatus 100 converts the operation mode of the image forming apparatus from a power saving mode to a normal mode at operation S1940.

If the operation mode is converted to a normal mode, the image forming apparatus 100 performs a function corresponding to the requested job performance command at operation S1945. When the job is completed, the image forming apparatus 100 may notify the host apparatus 10 that the requested job performance has been completed at operation S1950.

As such, the authentication processing method according to the exemplary embodiment performs the first authentication based on information stored in the image forming apparatus 100, and thus authentication may be performed in a rapid manner. Further, it is possible that while the first authentication is not performed, the second authentication may be performed in another way. Accordingly, even if a user requests a job using another apparatus which is not an authorized apparatus, the requested job may be performed. In addition, as the second authentication is performed in the management server, authentication of various users may be performed.

Meanwhile, in the above exemplary embodiment, user information is requested and received in a case the first authentication is failed. However, if the first authentication is failed, the job performance command may be disregarded, and if the authentication is succeeded, the user information may be received in order to perform double authentication, depending on exemplary embodiments.

In the above exemplary embodiment, the user information is transmitted in response to a user information request of the image forming apparatus 100, but the user information may be transmitted along with a job performance command, which will be explained with reference to FIG. 20.

Figure 20:
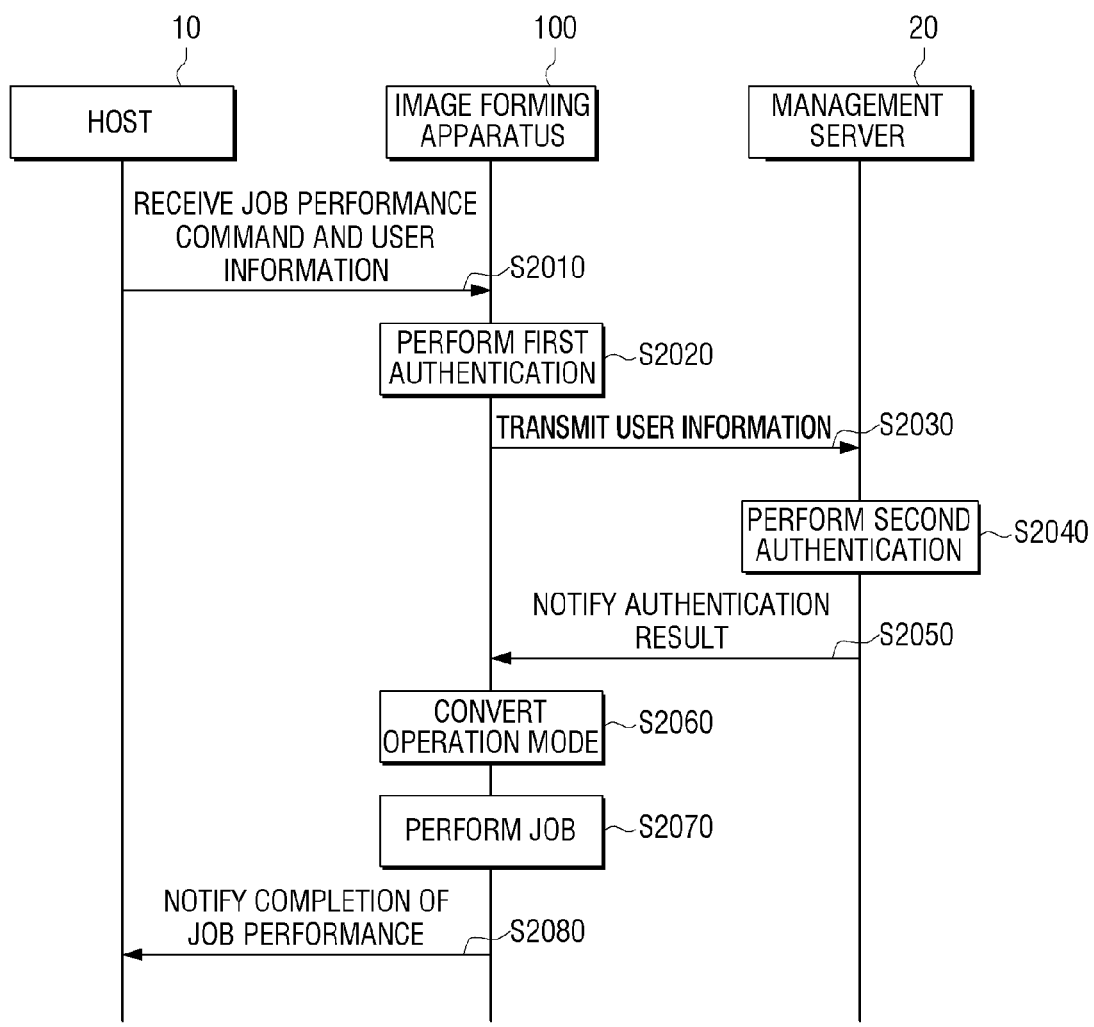
FIG. 20 is a sequence view illustrating an authentication processing method according to an exemplary embodiment of the present general inventive concept.

FIG. 20 is a sequence view illustrating an authentication processing method according to an exemplary embodiment of the present general inventive concept. The authentication processing method according to the exemplary embodiment relates to an operation of receiving user information along with a job performance request, performing a first authentication in an image forming apparatus therein using address information or user information, and performing a second authentication using an external management server.

Referring to FIG. 20, the host apparatus 10 transmits a job performance command and user information to the image forming apparatus 100 at operation S2010. The host apparatus 10 may receive the user information from a user before receiving a printing command (job performance command). Such an operation may be a log-on operation in the process of booting of the host apparatus 10, a log-on operation for network connection, or an operation of inputting the corresponding command. If a job performance command (for example, a printing command) is received from a user, the host apparatus 10 may transmit the job performance command along with user information to the image forming apparatus 100.

Subsequently, the image forming apparatus which receives the user information performs authentication at operation S2020. In this case, the first authentication may be performed according to whether the IP address and/or MAC address of the host apparatus 10 which has transmitted the job performance command is pre-registered in the image forming apparatus 100 or whether the received user information is in the pre-stored user information. In this case, if the first authentication is succeeded, conversion of an operation mode may be performed immediately.

On the other hand, if the first authentication using address information or user information which is pre-stored in the image forming apparatus 100 is not succeeded at operation S2020, the image forming apparatus 100 transmits the received user information to the management server 20 at operation S2030.

The management server 20 which receives the user information may perform the second authentication at operation S2040. The management server 20 may determine whether there is the user information received from the host apparatus 10 which has transmitted the job performance command in pre-stored user account information by comparing the user information received from the host apparatus 10 (for example, ID and password) with the pre-stored user account information.

The management server 20 notifies the authentication processing result to the image forming apparatus 100 at operation S2050, and if it is determined that the job performance command is from an authenticated external apparatus based on the authentication processing result, the image forming apparatus 100 converts the operation mode of the image forming apparatus from a power saving mode to a normal mode at operation S2060.

If the operation mode is converted to a normal mode, the image forming apparatus 100 performs a function corresponding to the requested job performance command at operation S2070. When the job is completed, the image forming apparatus 100 may notify the host apparatus 10 that the requested job performance has been completed at operation S2080.

As such, the authentication processing method according to the exemplary embodiment performs the first authentication based on information stored in the image forming apparatus 100, and thus authentication may be performed in a rapid manner. Further, it is possible that while the first authentication is not performed, the second authentication may be performed in another way. Accordingly, even if a user requests a job using another apparatus, the requested job may be performed. In addition, as the second authentication is performed in the management server, authentication of various users may be performed. Also, user information is provided to the image forming apparatus along with a printing command and thus, authentication may be performed in more rapid manner.

Meanwhile, in the above exemplary embodiment, if the first authentication is failed, the second authentication is performed using a management server. However, if the first authentication is failed, the job performance command may be disregarded, and if the first authentication is succeeded, authentication may be performed using the management server FIGS. 21 to 26 are views illustrating examples of address information pre-stored in the image forming apparatus 100 according an exemplary embodiment of the present general inventive concept.

Figure 22:
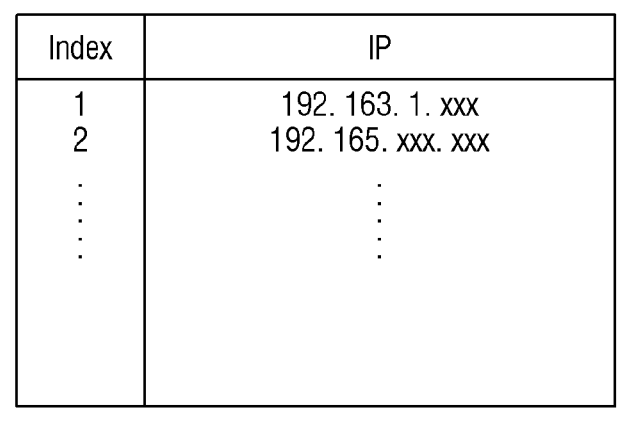

Referring to FIGS. 21 and 22, a pre-stored address is an IP address. Herein, the IP address is an identification address assigned to an apparatus and may be formed with 32 bits (4 bytes).

Such an IP address is an IP address of a host apparatus which is authorized to use the image forming apparatus 100 by a user or a manager. Such an IP address which is stored in the image forming apparatus 100 may be edited by a user or manager.

Meanwhile, the image forming apparatus 100 may perform authentication by using such an IP address illustrated in FIG. 21, that is, by comparing the IP address of an external apparatus which has requested a current job with the stored IP address.

The IP address is assigned based on a certain rule, and each host apparatus has a common IP address area on the same network. In this regard, an image forming apparatus may store information regarding part of 32 bits (4 bytes) of IP address as illustrated in FIG. 22.

Accordingly, the image forming apparatus 100 may perform authentication by using such an IP address illustrated in FIG. 21, that is, by comparing the IP address of an external apparatus which has requested a current job with the stored IP address. For example, if the IP address of an external apparatus which has currently requested job performance is 192.163.1.255, the apparatus is determined to be authenticated, and if the IP address is 192.163.2.255, the apparatus is determined not to be authenticated.

Meanwhile, in the above exemplary embodiment, only an example of using an IP address of 32 bits based on IPv4 is illustrated and explained, but an IP address of 128 bits based on IPv6 may be used.

In addition, in the above exemplary embodiment, only an example of using an IP address as address information is used, but a MAC address may be used as address information, which will be explained below with reference to FIG. 23.

Figure 23:
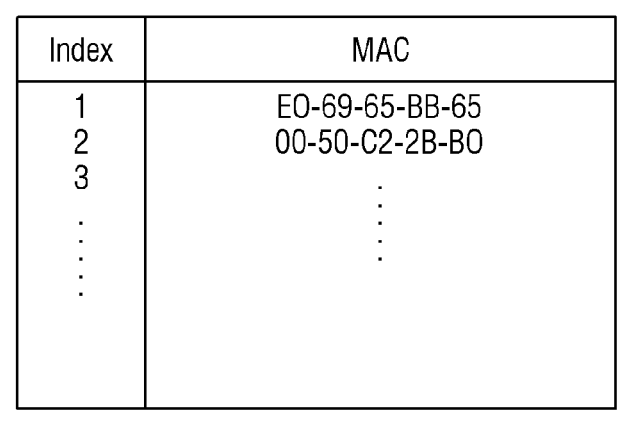

Referring to FIG. 23, a pre-stored address is a MAC address. Herein, the MAC address is a physical address of Ethernet, and may be formed with 48 bits (6 bytes).

Such a MAC address is a MAC address of a host apparatus (or an external apparatus) which is authorized to user the image forming apparatus 100 by a user or a manager. Such a MAC address which is stored in the image forming apparatus 100 may be edited by a user or manager.

Meanwhile, the image forming apparatus 100 may perform authentication by using such a MAC address illustrated in FIG. 23, that is, by comparing the MAC address of an external apparatus which has requested a current job with the stored MAC address.

Meanwhile, in the above exemplary embodiment, an example of using an IP address or a MAC address as address information is explained, but the address information may be stored in the form of a look-up table including an IP address and a MAC address as illustrated in FIG. 24.

As such, if a look-up table is stored, the image forming apparatus 100 may perform authentication using a MAC address or an IP address, and may perform authentication both the MAC address and the IP address.

FIGS. 25 and 26 are views illustrating examples of user information pre-stored in the image forming apparatus 100 according to an exemplary embodiment.

Referring to FIG. 25, pre-stored user information is an ID and a password. The image forming apparatus 100 may store a plurality of IDs and passwords corresponding to a plurality of IDs in the form of a look-up table.

Such IDs and passwords are IDs and passwords of users who are authorized to use the image forming apparatus 100 by a user or a manager. The IDs and passwords stored in the image forming apparatus 100 may be edited by a user or a manager.

Meanwhile, the image forming apparatus 100 may perform user authentication by determining whether the user information received from the external apparatus exists in the look-up table.

In the above exemplary embodiment, only IDs and passwords exist in the look-up table, but authority information for each user information may also be stored, which will be explained below with reference to FIG. 26.

Referring to FIG. 26, a look-up table may include a plurality of IDs, passwords corresponding to each of a plurality of IDs, information regarding whether there is printing authority corresponding to a plurality of IDs, and information regarding whether there is a fax transmission authority corresponding to a plurality of IDs.

Accordingly, the image forming apparatus 100 may perform authentication of a user who has requested job performance using the look-up table as illustrated in FIG. 26, and determine whether the user who requested job performance has authority for the requested job.

Meanwhile, in the above exemplary embodiment, only printing authority and fax transmission authority are stored as authority information, but authority for other functions of the image forming apparatus 100 may be stored depending on exemplary embodiments. In addition, in the above exemplary embodiment, only information regarding whether there is authority is stored, but information regarding not only whether there is authority but also how many jobs can be performed may be stored depending on exemplary embodiments. For example, the amount of printing jobs that user A can perform for one month (for example, 100 pages) may be stored as look-up table information.

Figure 27:
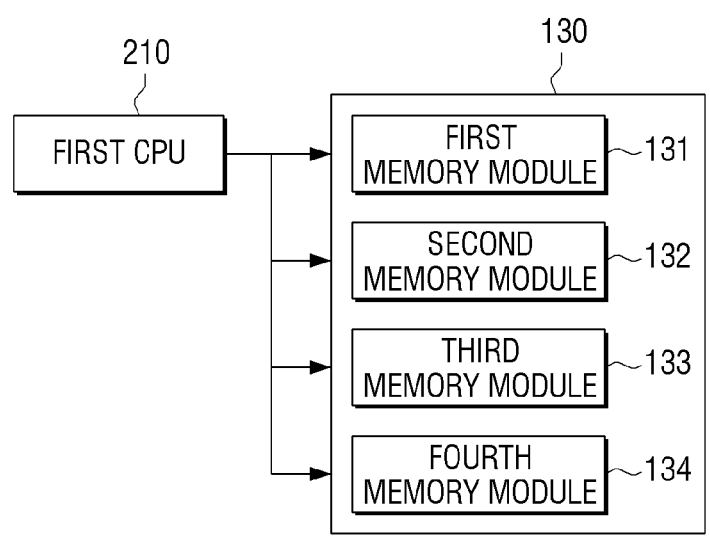
FIG. 27 is a view illustrating configuration of a first memory of an image forming apparatus according to an exemplary embodiment of the present general inventive concept.

FIG. 27 is a view illustrating the first memory 130 of FIG. 3 according to an exemplary embodiment of the present general inventive concept.

Referring to FIGS. 3 and 27, the first memory 130 may include a plurality of memory modules 131, 132, 133, and 134.

Each of the plurality of memory modules 131, 132, 133, and 134 may be realized as a non-volatile memory.

The first CPU 210 may determine at least one of the memory modules to be used based on a capacity or type of a requested job. The first CPU 210 may determine a memory module to be used from among a plurality of memory modules based on the capacity of a requested job. For example, the first CPU may determine a memory module to be used based on image size information written in a header area of data corresponding to a requested job. For example, if each memory capacity is 256 KB, a capacity for basic programs is 128 KB, and a capacity for a job requested from an outside apparatus is 52 KB, and thus it is possible to perform the requested job using only one memory module, only the first memory module may be set as a memory module to be used.

In addition, the first CPU 210 may determine a memory module to be used based on a type of a requested job. For example, each of a plurality of memory modules may be mapped as the first memory 131 which is commonly used, the second memory module 132 which is used for printing, the third memory module 133 which is used for scanning, and the fourth memory module 134 which is used for a fax job. Accordingly, if a job requested from an outside apparatus is a printing job, the first memory module and the second memory module may be set as memory modules to be used.

Further, the first CPU 210 may determine an operation state of a plurality of memory modules based on a determined memory module. The first CPU 210 may control or operate a memory module which is determined to be used in a normal mode, and a memory module which is determined not to be used in a self-refresh mode or in a power cut-off mode.

In addition, the first CPU 210 may perform a control operation of the function unit 120 using only a determined memory module (that is, only a portion of memory modules).

Meanwhile, if an additional job is requested in the process of preforming an operation or if an additional memory space is required, the first CPU 210 may change a memory module to be used. In this case, it is possible the first CPU may add one more memory module to the memory module.

As described above, the first CPU may select and use a memory module to be operated according to a job performance request, and thus power consumption may be reduced during a normal mode.

In the above exemplary embodiment, one memory is realized using four memory modules, but one memory module may include two or three memory modules, or more than five memory modules.

Figure 28:
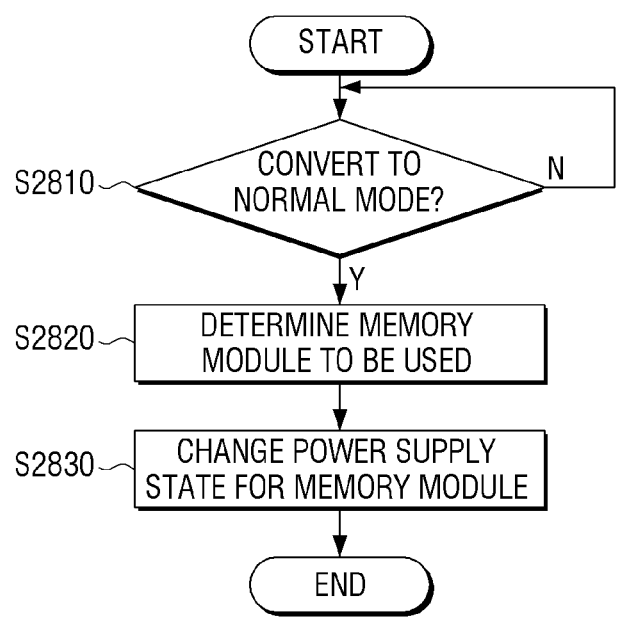
FIG. 28 is a flowchart illustrating a driving control method according to an exemplary embodiment of the present general inventive concept.

FIG. 28 is a flowchart illustrating a driving control method according to an exemplary embodiment of the present general inventive concept.

Referring to FIG. 28, in a power saving mode, all of a plurality of memory modules of a first memory operate in a self-refresh mode or in a power cut-off mode.

Subsequently, if the operation mode of an image forming apparatus is converted from a power saving mode to a normal mode at operation S2810-Y, a memory module to be used from among a plurality of memory modules may be determined at operation S2820, and a power supply state is changed mode according to the determined memory module at operation S2830. lit is possible that a memory module to be used may be determined based on a capacity of a requested job. For example, if each memory capacity is 256 KB, a capacity for basic programs is 128 KB, and a capacity for a job requested from outside is 52 KB, and thus it is possible to perform the requested job using only one memory module, only the first memory module may be set as a memory module to be used.

It is also possible that a memory module to be used may be determined based on a type of a requested job. For example, each of a plurality of modules may be mapped as the first memory 131 which is commonly used, the second memory module 132 which is used for printing, the third memory module 133 which is used for scanning, and the fourth memory module 134 which is used for a fax job. Accordingly, if a job requested from an outside apparatus is a printing job, the first memory module and the second memory module may be set as memory modules to be used.

Once a memory module to be used is determined, the determined memory module may be initialized and operated, and the memory module which is not selected may operate in a self-refresh mode or in a power cut-off mode. The driving control method illustrated in FIG. 28 may be performed in an image forming apparatus having the configurations of FIG. 3 to FIG. 5 and in an image forming apparatus having other configurations.

In the above-described driving control method according to the third exemplary embodiment may be realized as a program including an algorithm executable in a computer, and the program may be stored in a non-transitory computer readable medium and provided therein.

Figure 29:
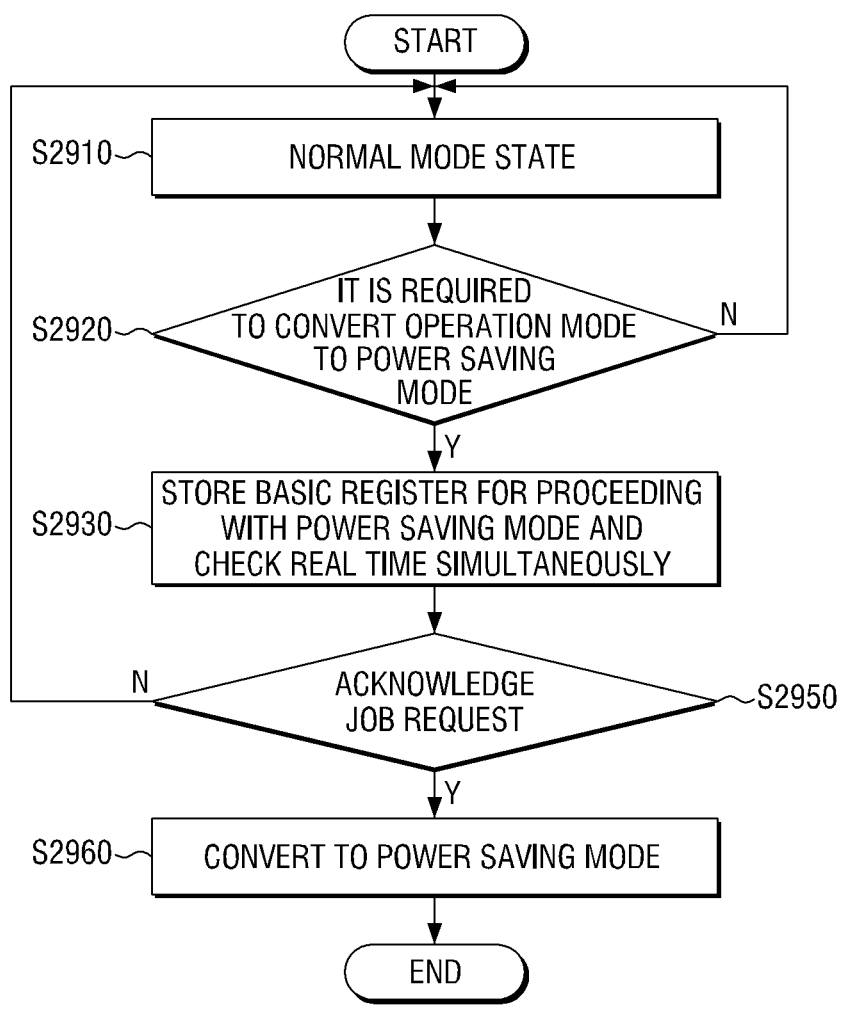
FIG. 29 is a flowchart illustrating a driving control method according to an exemplary embodiment of the present general inventive concept.

FIG. 29 is a flowchart illustrating a driving control method according to an exemplary embodiment of the present general inventive concept.

An operation of determining whether to perform an operation of the image forming apparatus 100 will be explained hereinafter. Firstly, a state of each function unit is checked by reading a memory which displays the state of each function unit at predetermined time intervals using a program thereof. Before the operation mode is converted to a power saving mode, data used in each function unit is stored in a second memory.

However, if the state of each function unit is read and determined using the program, a processing time becomes slow, and thus a printing command may be input in the process of conversion. In this case, the image forming apparatus 100 needs to restore the information stored in the second memory back in a first memory. Thus, a method to check the state of the function unit rapidly using hardware is required, which will be explained below with reference to FIG. 29.

Referring to FIG. 29, an operation state of the image forming apparatus 100 is set to a normal mode at operation S2910. In the normal mode, the operation state of the function unit 120 is stored in the state analyzing unit 190 by a flag bit unit.

In this case, if an operation is not performed for a predetermined time period, the image forming apparatus 100 may determine whether it is necessary to convert the operation mode to a power saving mode at operation S2920. The image forming apparatus 100 may determine whether it is necessary to convert the operation mode to a power saving mode using the store flag bit as an interrupt.

If it is determined that the operation mode should be converted to a power saving mode at operation S2920-Y, the state of the function unit may be checked and at the same time, the state information of the function unit may be stored at operation S2930. The state analyzing unit 190 may provide a flag bit to the first CPU 210 and at the same time, the state information of the function unit 120 may be stored in the second memory 140.

Subsequently, whether there is an additional job request is determined at operation S2950, that is, whether there is a job performance command in the process of conversion is determined. If there is no additional request, the operation mode of the image forming apparatus 100 may be converted to a power saving mode at operation S2960.

In the driving control method according to the exemplary embodiment, the first CPU performs an operation in the process of converting the operation mode to a power saving mode. In addition, the state of the function unit is managed using separate hardware configuration, and thus conversion to a power saving mode may be performed rapidly. The driving control method illustrated in FIG. 29 may be performed in an image forming apparatus having the configurations of FIG. 2 to FIG. 5 and in an image forming apparatus having other configurations.

In the above-described driving control method according to the third exemplary embodiment may be realized as a program including an algorithm executable in a computer, and the program may be stored in a non-transitory computer readable medium and provided therein.

Figure 30:
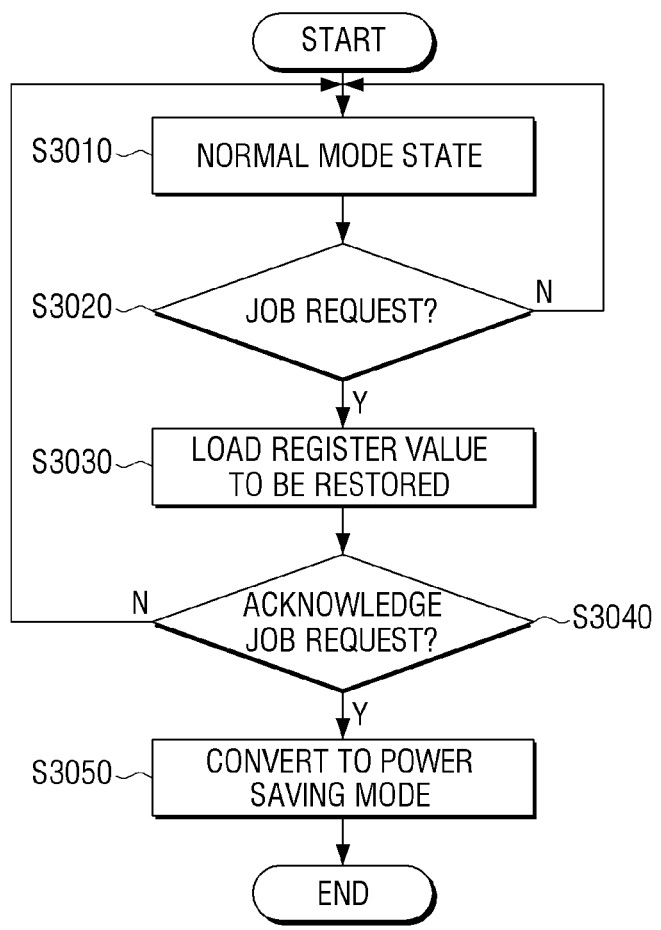
FIG. 30 is a flowchart illustrating a driving control method according to an exemplary embodiment of the present general inventive concept.

FIG. 30 is a flowchart illustrating a driving control method according to an exemplary embodiment of the present general inventive concept.

Referring to FIG. 30, an operation state of an image forming apparatus 100 is a power saving mode at operation S3010.

If a job performance command is input while the operation state of the image forming apparatus 100 is a power saving mode at operation S3020, authentication is performed as explained above.

Subsequently, a register value to be restored is loaded at operation S3030. When it takes time to perform authentication, a register value to be restored may be loaded before conversion of an operation mode by the authentication in order for fast restoration. That is, the first CPU 260 may not initialize a function unit, but the state analyzing unit 190 initializes each function unit, for example, the function unit 120 of FIG. 3.

If it is determined that a job request is received form an authenticated user or apparatus at operation S3040-Y, the operation mode may be converted at operation S3050.

In the driving control method according to the fourth exemplary embodiment, a wake-up operation such as the operation of initializing the function unit when a power saving mode is converted to a normal mode is performed using separate hardware configuration, that is, the state analyzing unit. Accordingly, conversion may be performed rapidly. The driving control method illustrated in FIG. 30 may be performed in an image forming apparatus having the configurations of FIG. 2 to FIG. 5 and in an image forming apparatus having other configurations.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertain.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus having a plurality of operation modes, comprising:
    a communication interface unit to communicate with an external apparatus;
    a controller to perform authentication of the external apparatus while maintaining a power saving mode when a job performance command is received from the external apparatus when an operation mode of the image forming apparatus is the power saving mode; and
    a function unit to convert an operation mode of the image forming apparatus according to the authentication result and to perform a function corresponding to the job performance command, wherein
    the controller comprises:
    a main CPU to control the function unit in a normal mode; and
    an auxiliary CPU to perform the authentication of the external apparatus by comparing address information of the external apparatus which has transmitted the job performance command with pre-stored address information of the external apparatus when the job performance command is received from the external apparatus in the power saving mode.

2. The apparatus as claimed in claim 1, wherein when the operation mode is the power saving mode, the auxiliary CPU converts an operation mode of the image forming apparatus from the power saving mode to the normal mode according to the authentication result.

3. The apparatus as claimed in claim 1, wherein the address information is at least one of an IP address and a MAC address of the external apparatus.

4. The apparatus as claimed in claim 1, wherein the auxiliary CPU determines whether a function corresponding to the job performance command is executable based on the authentication result, and converts the operation mode of the image forming apparatus from the power saving mode to the normal mode according to the determination result.

5. The apparatus as claimed in claim 4, wherein the auxiliary CPU controls the communication interface unit to notify the external apparatus which has transmitted the job performance command of the authentication result and the determination result.

6. The apparatus as claimed in claim 1, further comprising:
a first memory to operate during the normal mode, and to operate in a self-refresh mode or in a power cut-off mode during the power saving mode; and
a second memory to store job data corresponding to the job performance request during the power saving mode,
wherein the auxiliary CPU deletes the job data stored in the second memory when the job performance command is received from an unauthenticated external apparatus based on the authentication result.

7. The apparatus as claimed in claim 1, further comprising:
a first memory to include a plurality of memory modules,
wherein the main CPU performs a control operation of the function unit using only a portion of the memory modules from among the plurality of memory modules according to the job performance command.

8. The apparatus as claimed in claim 7, wherein the main CPU controls the first memory to operate a memory module which is not used during a control operation in a self-refresh mode or in a power cut-off mode.

9. The apparatus as claimed in claim 7, further comprising:
a state analyzing unit to analyze a state of the function unit periodically during a normal mode and stores state information of the function unit,
wherein the controller determines a time to convert the operation mode of the image forming apparatus using the state information stored in the state analyzing unit.

10. A driving control method of an image forming apparatus having a plurality of operation modes, the method comprising:
receiving a job performance command from an external apparatus in a power saving mode;
performing authentication of the external apparatus while maintaining the power saving mode;
when it is determined that a job performance command is input from an unauthenticated external apparatus based on the authentication result, maintaining an operation mode of the image forming apparatus as the power saving mode;
controlling the image forming apparatus in a normal mode with a main CPU; and
performing, with an auxiliary CPU, the authentication of the external apparatus by comparing address information of the external apparatus which has transmitted the job performance command with pre-stored address information of the external apparatus when the job performance command is received from the external apparatus in the power saving mode.

11. The method as claimed in claim 10, further comprising:
when it is determined that the job performance command is input from an authenticated external apparatus based on the authentication result, converting the operation mode of the image forming apparatus to the normal mode, and performing a function corresponding to the job performance command.

12. The method as claimed in claim 10, wherein the address information is at least one of an IP address and a MAC address of the external apparatus.

13. The method as claimed in claim 10, wherein the performing the authentication comprises performing the authentication by requesting the external apparatus which has transmitted the job performance command to transmit user information and comparing the user information received in response to the request with pre-stored user information.

14. A non-transitory computer-readable medium to contain computer-readable codes as a program to execute the method of claim 10.

15. An image forming apparatus having a plurality of operation modes, comprising:
a function unit having electrical and mechanical components to perform an image forming function; and
a controller to receive a job performance command from an external apparatus in a power save mode, to maintain the power saving mode until authentication is performed on at least one of the external apparatus or a user of the external apparatus, and to change the operation mode of the function unit to perform the image forming function corresponding to the job performance command according to the authentication result, the controller including a main CPU to control the function unit in a normal mode and an auxiliary CPU to perform the authentication by comparing address information of the external apparatus which has transmitted the job performance command with pre-stored address information of the external apparatus when the job performance command is received in the power save mode.

16. The image forming apparatus of claim 15, wherein the function unit is in the power saving mode during the authentication.

17. The apparatus as claimed in claim 1, wherein the auxiliary CPU cuts off power to the main CPU when the operation mode of the image forming apparatus is the power saving mode.

18. The apparatus as claimed in claim 1, wherein the auxiliary CPU has lower resources and lower power consumption than the main CPU.

19. The apparatus as claimed in claim 1, wherein the function unit is configured to perform a plurality of functions corresponding to the job performance command and the function unit includes a plurality of components for performing the plurality of functions, and
the controller provides power to only one or more of the plurality of components of the function unit that are identified by the job performance command when the function unit converts the operation mode of the image forming apparatus from the power saving mode to the normal mode.

* * * * *